(12) United States Patent
Shabtay et al.

(10) Patent No.: US 11,789,143 B2
(45) Date of Patent: Oct. 17, 2023

(54) RADAR APPARATUS, SYSTEM, AND METHOD OF GENERATING ANGLE OF ARRIVAL (AOA) INFORMATION

(71) Applicant: Intel Corporation, Santa Clara, CA (US)

(72) Inventors: Ophir Shabtay, Tsofit (IL); Joseph Tabrikian, Tel Aviv-Jaffa (IL); Thushara Hewavithana, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 263 days.

(21) Appl. No.: 17/133,924

(22) Filed: Dec. 24, 2020

(65) Prior Publication Data

US 2021/0116531 A1    Apr. 22, 2021

(51) Int. Cl.
*G01S 13/931*    (2020.01)
*G01S 3/74*    (2006.01)
(Continued)

(52) U.S. Cl.
CPC .............. *G01S 13/931* (2013.01); *G01S 3/74* (2013.01); *G01S 13/426* (2013.01); *G06F 18/2431* (2023.01)

(58) Field of Classification Search
CPC ........ G01S 3/74; G01S 13/426; G01S 13/931; G01S 13/584; G01S 13/325;
(Continued)

(56) References Cited

U.S. PATENT DOCUMENTS 9,594,159 B2 *   3/2017   Wang ...................... G01S 7/414
2016/0282450 A1 *  9/2016   Kishigami ............ G01S 13/426
(Continued)

FOREIGN PATENT DOCUMENTS

JP        2018004513 A   *   1/2018

OTHER PUBLICATIONS

S. Xu, J. Wang and A. Yarovoy, "Super Resolution DOA for FMCW Automotive Radar Imaging," 2018 IEEE Conference on Antenna Measurements & Applications (CAMA), 2018, pp. 1-4, doi: 10.1109/CAMA.2018.8530609. (Year: 2018).*

(Continued)

*Primary Examiner* — Vladimir Magloire
*Assistant Examiner* — Yonghong Li
(74) *Attorney, Agent, or Firm* — Shichrur & Co.

(57) ABSTRACT

For example, a radar processor may be configured to determine a first 1D AoA spectrum corresponding to a first dimension of an Azimuth-Elevation domain based on radar Rx data, to determine a second 1D AoA spectrum corresponding to a second dimension of the Azimuth-Elevation domain based on the radar Rx data, to detect one or more first object hypotheses in the first dimension based on the first 1D AoA spectrum, to detect one or more second object hypotheses in the second dimension based on the second 1D AoA spectrum, to determine a plurality of 2D object hypotheses corresponding to the Azimuth-Elevation domain based on the first object hypotheses and the second object hypotheses, and to generate 2D AoA information based on a 2D AoA spectrum analysis of the radar Rx data according to the plurality of 2D object hypotheses.

25 Claims, 12 Drawing Sheets

(51) Int. Cl.
*G01S 13/42* (2006.01)
*G06F 18/2431* (2023.01)

(58) Field of Classification Search
CPC ............... G01S 13/343; G01S 13/881; G01S 2013/0245; G01S 7/356; G01S 2013/93271; G06K 9/628
See application file for complete search history.

(56) References Cited

U.S. PATENT DOCUMENTS

2019/0324134 A1   10/2019   Cattle
2020/0333457 A1   10/2020   Bialer et al.

OTHER PUBLICATIONS

Y. Gürcan and A. Yarovoy, "Super-resolution algorithm for joint range-azimuth-Doppler estimation in automotive radars," 2017 European Radar Conference (EURAD), 2017, pp. 73-76, doi: 10.23919/EURAD.2017.8249150. (Year: 2017).*

Razavi-Ghods, Nima. "Characterisation of MIMO radio propagation channels." PhD diss., Durham University, 2007. from etheses.dur.ac.uk/2526/1/2526_537.pdf (Year: 2007).*

Madurasinghe, Dan, and Andrew Shaw. "TSI finders for estimation of the location of an interference source using an aribome array." EURASIP Journal on Advances in Signal Processing 2008 (2007): 1-17. (Year: 2008).*

Fast Fourier transform-wikipedia.pdf from https://web.archive.org/web/20200114080021/https://en.wikipedia.org/wiki/Fast_Fourier_transform (Year: 2020).*

JP2018004513A_Description_20220802_0853.pdf (translation of JP2018004513A) (Year: 2018).*

Partial Search Report for European Patent Application No. 21209866.9, dated May 30, 2022, 19 pages.

H. Krim and M. Viberg, "Two decades of array signal processing research", IEEE Transactions on Signal Processing Magazine, Jul. 1996, pp. 67-94.

J. Cadzow, "Multiple Source Location—The Signal Subspace Approach", IEEE Transactions on Acoustics, Speech, and Signal Processing, vol. 38, No. 7, Jul. 1990, pp. 1110-1125.

G. Bienvenu and L. Kopp, "Optimality of high resolution array processing using the eigensystem approach", IEEE Transactions on Acoustics, Speech and Signal Process, vol. ASSP-31, No. 5, pp. 1235-1248, Oct. 1983.

I. Ziskind and M. Wax, "Maximum likelihood localization of multiple sources by alternating projection", IEEE Transactions on Acoustics, Speech and Signal Process, vol. 36, No. 10, pp. 1553-1560, Oct. 1988.

M. Viberg, B. Ottersten, and T. Kailath, "Detection and estimation in sensor arrays using weighted subspace fitting", IEEE Transactions on Signal Processing, vol. 39, No. 11, pp. 2436-2449, Nov. 1991.

M. Feder and E. Weinstein, "Parameter estimation of superimposed signals using the EM algorithm", IEEE Transactions on Acoustic, Speech and Signal Proceeding, vol. 36, No. 4, pp. 477-489, Apr. 1988.

Y. Bresler and Macovski, "Exact maximum likelihood parameter estimation of superimposed exponential signals in noise", IEEE Transactions on Acoustic, Speech and Signal Proceeding, vol. ASSP-34, pp. 1824-1827, Oct. 1986.

J. Capon, "High-Resolution Frequency-Wavenumber Spectrum Analysis," Proceedings of the IEEE, vol. 57, No. 8, Aug. 1969, pp. 1408-1418.

Y. Zhang, W. Li, Y. Zhang, Y. Huang and J. Yang, "A Fast Iterative Adaptive Approach for Scanning Radar Angular Superresolution," in IEEE Journal of Selected Topics in Applied Earth Observations and Remote Sensing, vol. 8, No. 11, pp. 5336-5345, Nov. 2015.

Extended Search Report for European Patent Application No. 21209866.9, dated Aug. 30, 2022, 16 pages.

* cited by examiner

RADAR APPARATUS, SYSTEM, AND METHOD OF GENERATING ANGLE OF ARRIVAL (AOA) INFORMATION

TECHNICAL FIELD

Aspects described herein generally relate to radar devices, systems, and methods to generate Angle of Arrival (AoA) information.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
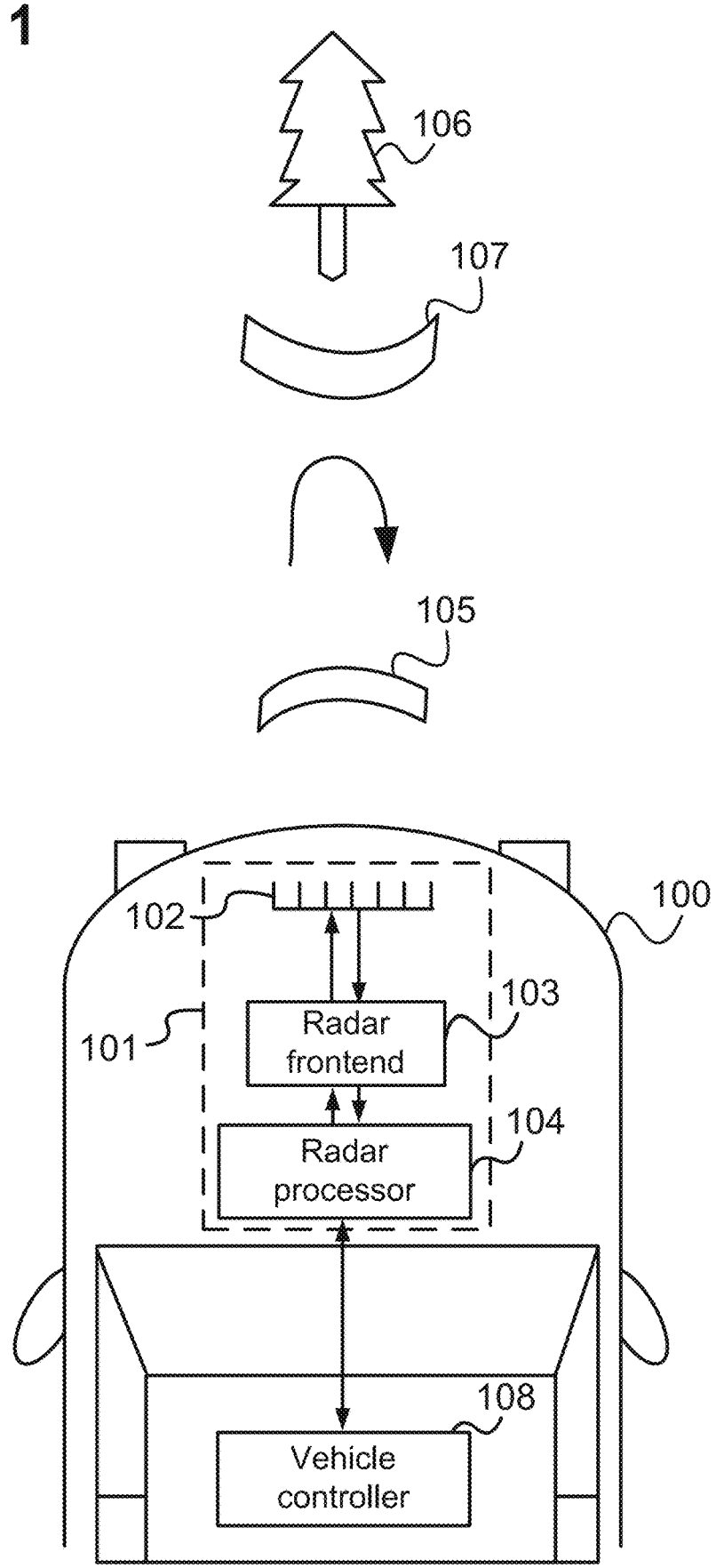
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

References to "one embodiment", "an embodiment", "demonstrative embodiment", "various embodiments" "one aspect", "an aspect", "demonstrative aspect", "various aspects" etc., indicate that the embodiment(s) and/or aspects so described may include a particular feature, structure, or characteristic, but not every embodiment or aspect necessarily includes the particular feature, structure, or characteristic. Further, repeated use of the phrase "in one embodiment" or "in one aspect" does not necessarily refer to the same embodiment or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/ or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/ deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: Taxonomy and definitions for terms related to driving automation systems for on road motor vehicles, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identify a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
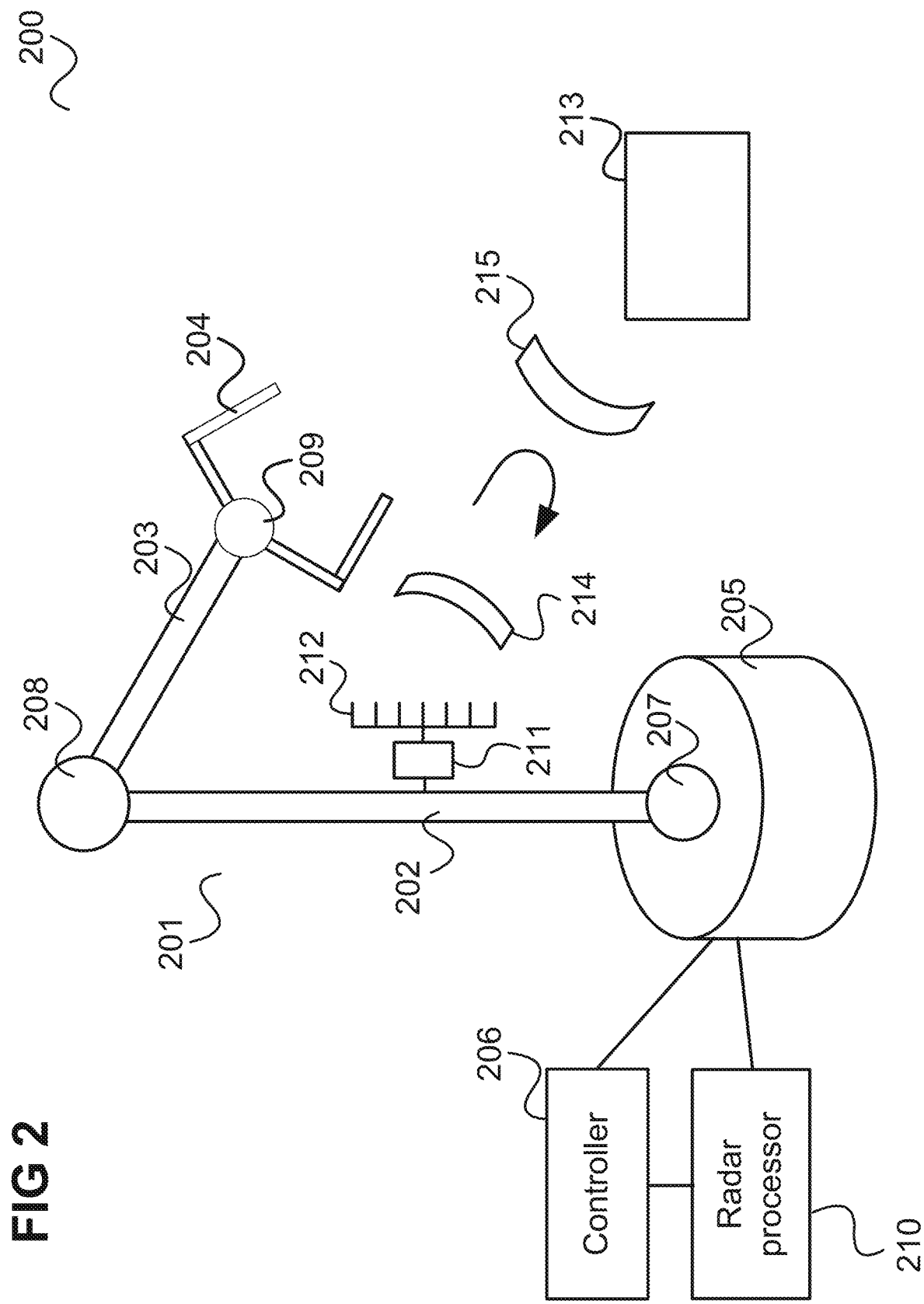
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
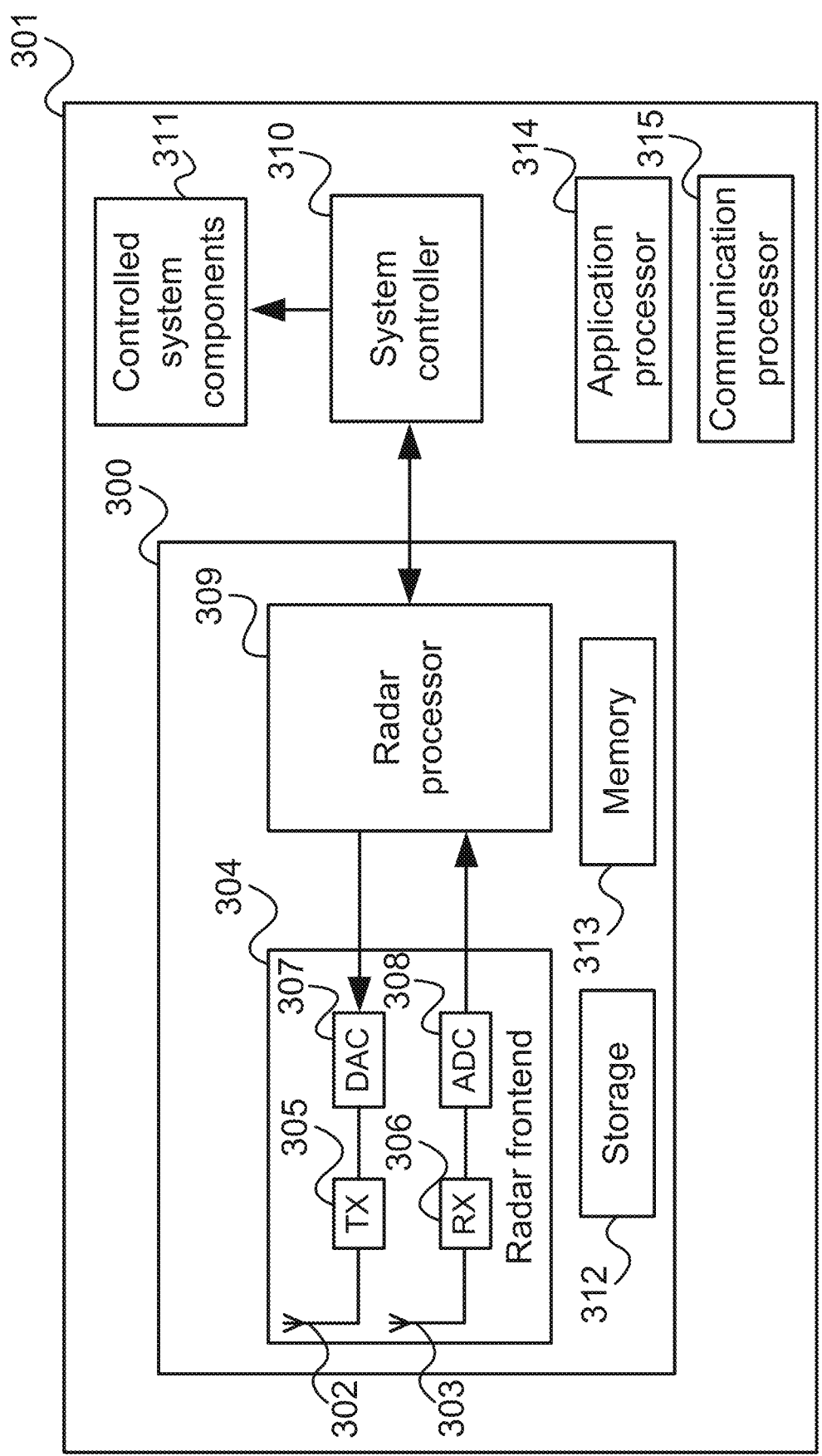
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital (ADC) Converter 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
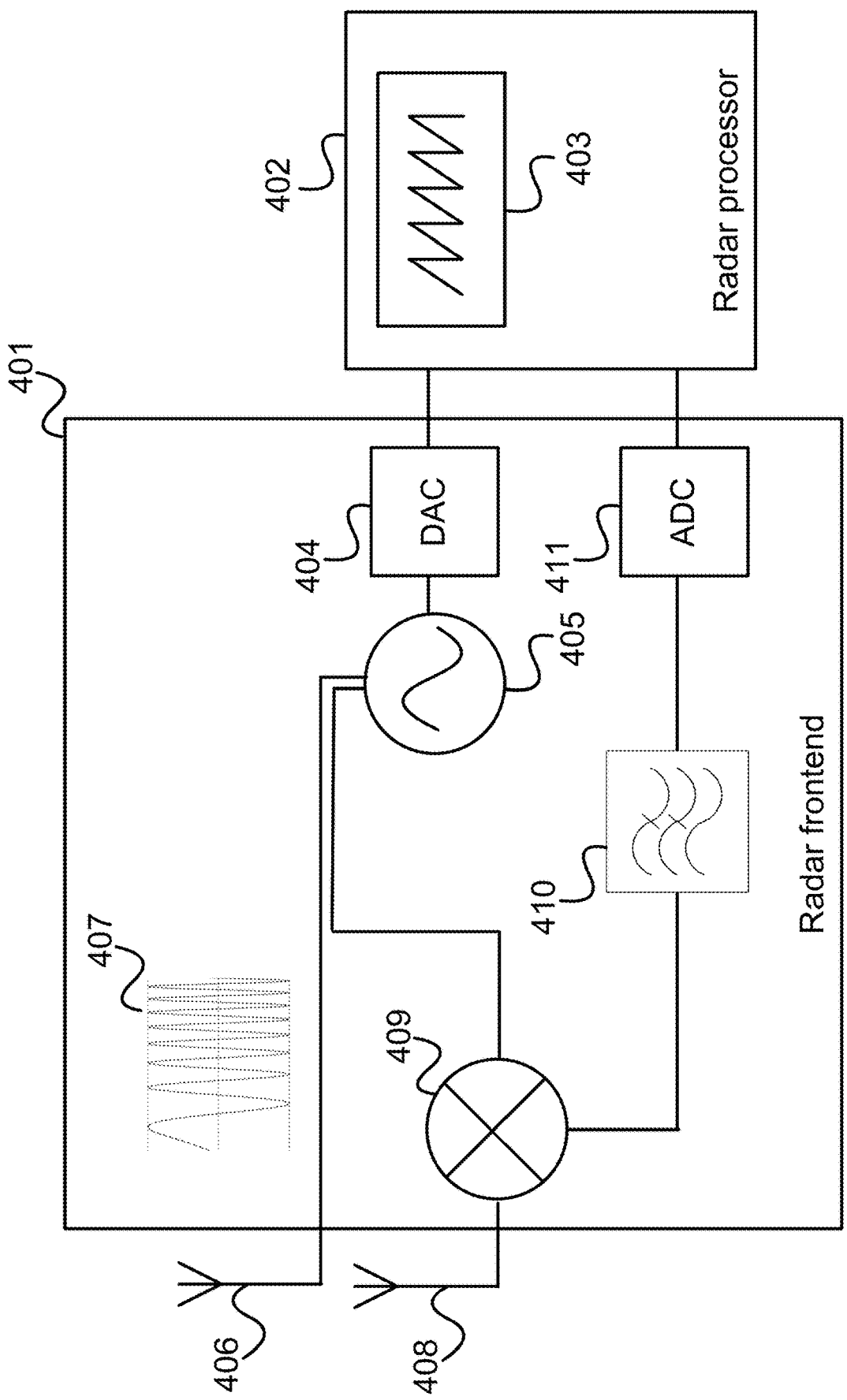
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
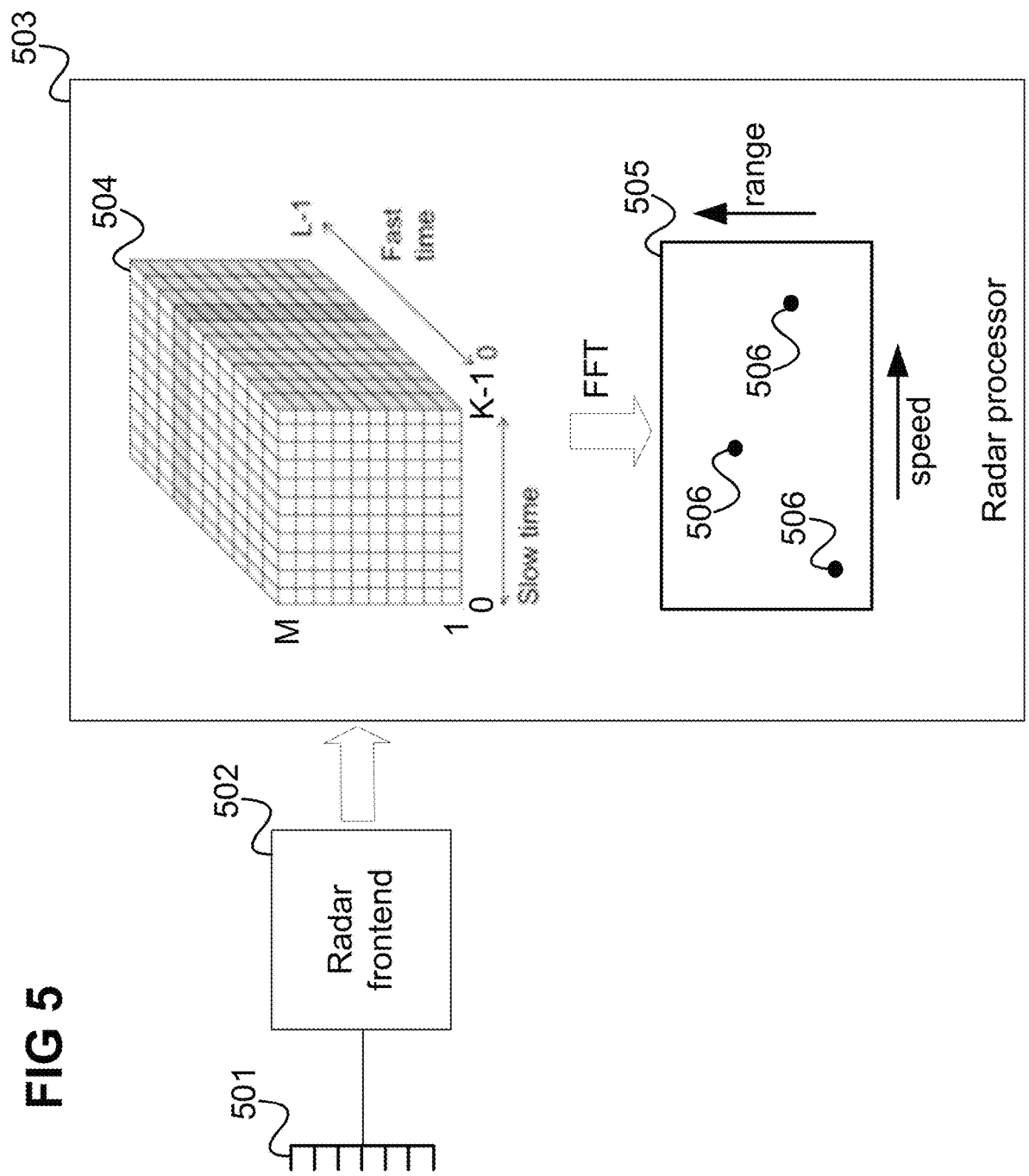
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1)

and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
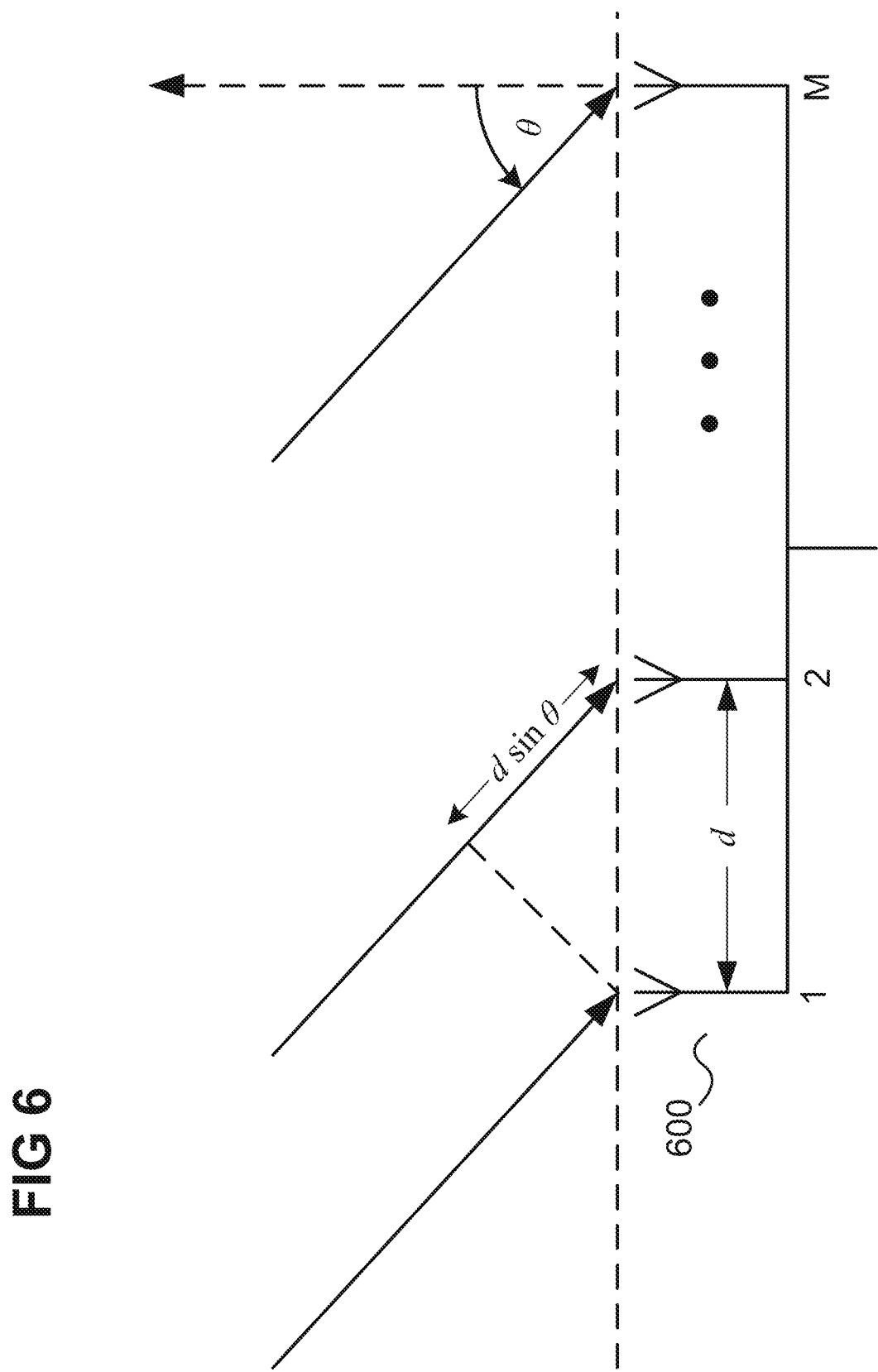
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted Asp, between two antennas of the receive antenna array 601 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
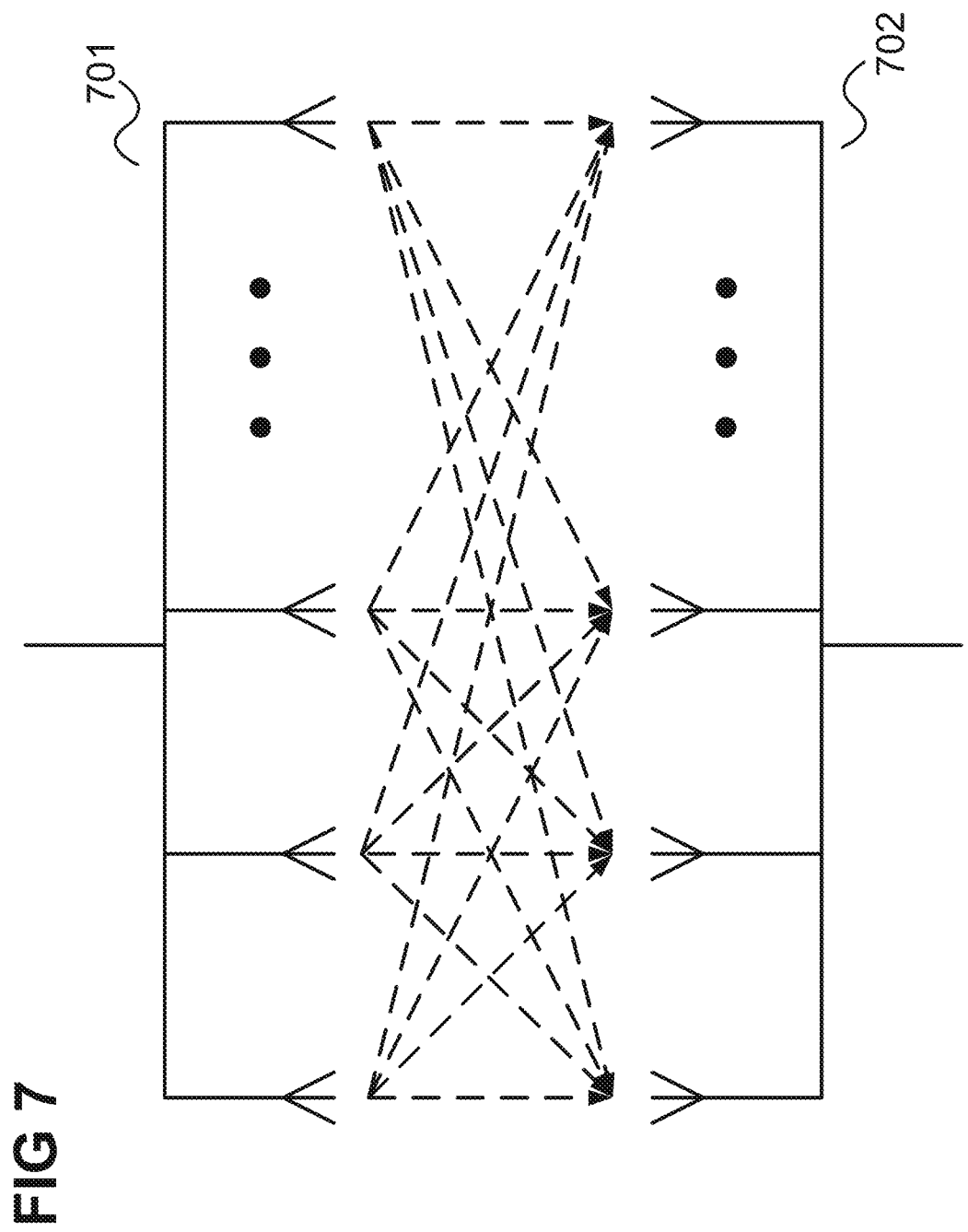
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
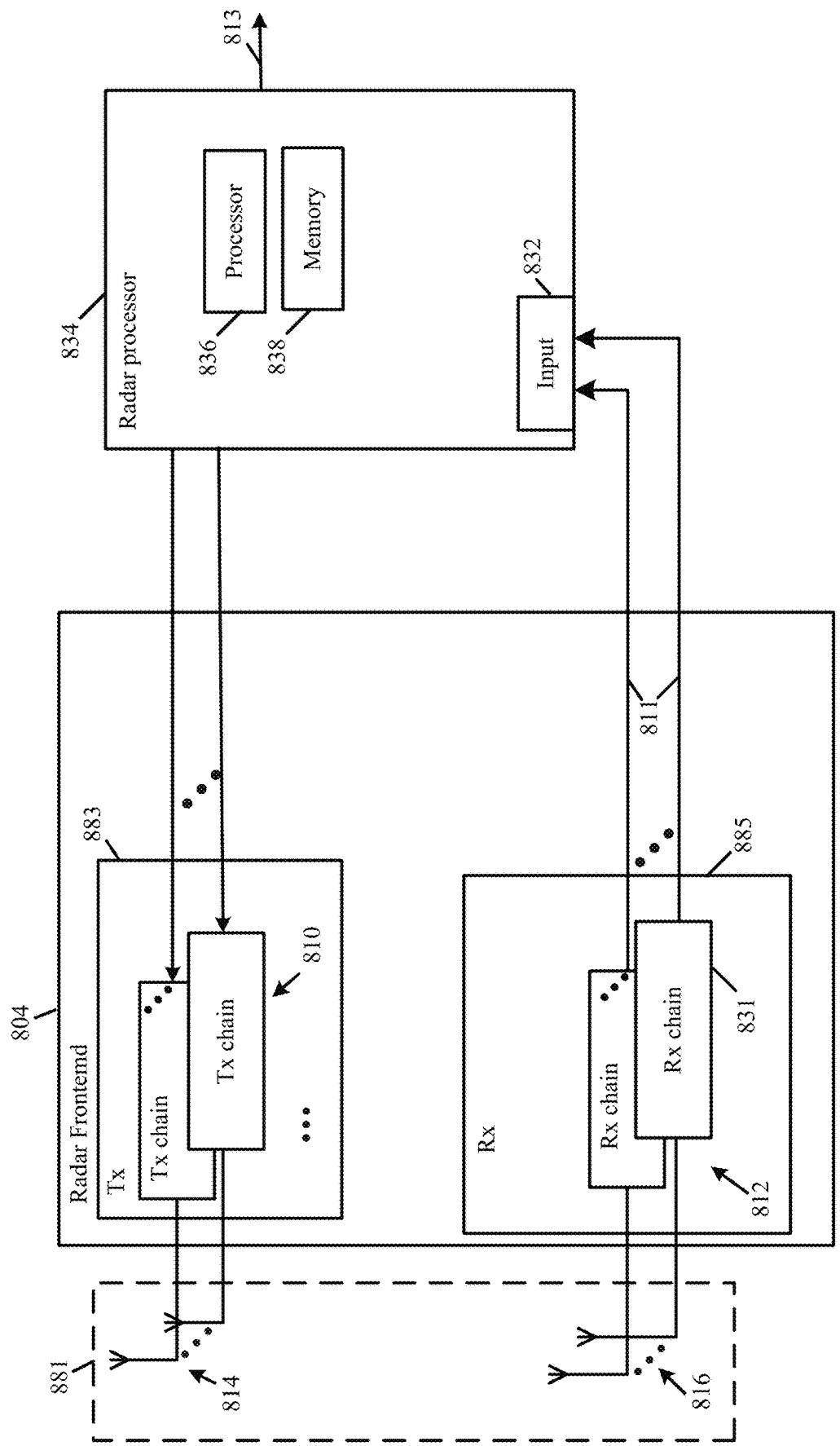
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a radar utilizing a radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, radar antenna 881 may include a MIMO radar antenna 881 including the plurality of Tx antennas 814 and the plurality of Rx antennas 816.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 1), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on Radar Rx data 811 received from the plurality of Rx chains 812. For example, radar Rx data 811 may be based on the Rx RF signals received via the Rx antennas 816.

In some demonstrative aspects, radar processor 834 may include an input 832 to receive the radar Rx data 811 from the plurality of Rx chains 812.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which maybe generated by processor 836, for example, based on the radar Rx data, e.g., as described below. In one example, the range information and/or Doppler information may be determined based on a Cross-Correlation (XCORR) operation, which may be applied to the radar RX data, e.g., as described below. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm, e.g., as described below. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array including a plurality of N elements, e.g., Tx antennas 814, and processing received signals via an Rx array including a plurality of M elements, e.g., Rx antennas 816.

In some demonstrative aspects, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, radar processor 834 may be configured to estimate a target position in a 4D space, which may be represented, for example, by a range, an azimuth (Az), an elevation (El), and a Velocity (V), e.g., as described below.

In some demonstrative aspects, radar processor 834 may be configured to estimate the azimuth and/or the elevation of the target, for example, using a planar 2 Dimensional (2D) antenna. For example, MIMO radar antenna 881 may include a 2D planar antenna array of Rx antennas 816.

Some demonstrative aspects are described herein with respect to a radar processor, e.g., radar processor 834, configured to process information of a 2D antenna, e.g., as described below. In other aspects, radar processor 834 may be configured to process information of a 3 Dimensional (3D) antenna.

In some demonstrative aspects, radar processor 834 may be configured to generate radar information 813 including a 2D AoA information over an Azimuth-Elevation domain. For example, the 2D AoA spectrum over the Azimuth-Elevation domain may be utilized to estimate an Azimuth and/or an Elevation of a target.

In some demonstrative aspects, radar processor 834 may be configured to generate the 2D AoA spectrum information, for example, according to one or more requirements, and/or criteria, which may support a high detection probability of targets, a low false-alarm rate of detected targets, and/or improved resolution, e.g., in terms of azimuth and/or elevation, for example, in a broad variance of target distribution, Signal to Noise Ratio (SNR), and/or dynamic range.

In some demonstrative aspects, there may be a need to provide a technical solution, for example, to generate the 2D AoA spectrum information, for example, according to the one or more requirements, and/or criteria, for example, while obviating a high computation complexity, e.g., as described below.

In some demonstrative aspects, there may be one or more technical disadvantages, inefficiencies, and/or problems, for example, in some use cases, implementations and/or scenarios, for example, when using a Beamforming (BF) filter to generate the 2D AoA spectrum information.

For example, the BF filter may provide suitable result with decent computation complexity. However, in order to reduce side lobes, a window may be used on an input array, which may enlarge a beam width and may cause a reduction in the AoA resolution.

In some demonstrative aspects, there may be a need to address one or more technical issues, for example, in some use cases, implementations and/or scenarios, for example, when using super resolution algorithms to generate the 2D AoA spectrum information, e.g., as described below.

In one example, some super resolution algorithms may be suitable for providing high resolution, and a low side lobe level, for example, with respect to a sparse array topology. However, these super resolution algorithms may require very high computation complexity and/or computation resources, for example, for matrix inversion, iterations and/or filtering, when applied with respect to large antenna arrays.

In some demonstrative aspects, radar processor 834 may be configured to generate 2D AoA information, for example, with a high detection probability of targets, a low false-alarm rate, and/or an increased resolution, for example, while supporting a reduced computation complexity, e.g., as described below.

In some demonstrative aspects, radar processor 836 may be configured to receive radar Rx data 811, e.g., via input 832, based on radar signals of a 2D radar antenna, e.g., radar antenna 881, e.g., as described below.

In some demonstrative aspects, radar processor 836 may be configured to generate radar information 813 including 2D AoA information in the Azimuth-Elevation domain, for example, based on radar Rx data 811, e.g., as described below.

In some demonstrative aspect, radar processor 836 may be configured to generate radar information 813 including 2D AoA information corresponding to a range-Doppler bin, e.g., as described below.

In some demonstrative aspects, radar processor 834 may be configured to determine radar data corresponding to a plurality of range-Doppler bins, for example, based on the radar Rx data 811, e.g., as described below.

In some demonstrative aspects, the plurality of range-Doppler bins may be configured based on a setting and/or implementation of a radar device implementing radar processor 834, e.g., radar device 101 (FIG. 1).

In some demonstrative aspects, radar processor 834 may be configured to determine the radar data corresponding to the range-Doppler bins, for example, by applying to the radar Rx data 811 a Cross Correlation (XCORR) operation, a fast Fourier Transfer (FFT) operation, and/or any other operation, function and/or algorithm.

In some demonstrative aspects, the radar data corresponding to the range-Doppler bins may include, for example, information of a radar frame, e.g., as described below. In other aspects, the radar data corresponding to the range-Doppler bins may include any other type and/or format of radar data, e.g., intermediate data, and/or processed data, which may be based on the radar Rx data 811.

In some demonstrative aspects, the radar data corresponding to the range-Doppler bins may be in the form of a radar frame, which may correspond to a plurality of range values, a plurality of Doppler values, a plurality of Rx channels, and a plurality of Tx channels.

In some demonstrative aspects, the plurality of range values may include a plurality of range bins, which may be configured based on a setting and/or implementation of a radar device implementing radar processor 834, e.g., radar device 101 (FIG. 1).

In some demonstrative aspects, the plurality of Doppler values may include a plurality of Doppler bins, which may be configured based on a setting and/or implementation of the radar device implementing radar processor 834, e.g., radar device 101 (FIG. 1).

In some demonstrative aspects, the plurality of Rx channels may correspond to the plurality of Rx antennas 816 and/or Rx chains 831.

In some demonstrative aspects, the plurality of Tx channels may correspond to the plurality of Tx antennas 814 and/or Tx chains 810.

In some demonstrative aspects, a range-Doppler-bin may correspond to a combination of a range value of the plurality of range values and a Doppler value of the plurality of Doppler values. For example, the range-Doppler bin may include radar data corresponding to the range value and the Doppler value.

In some demonstrative aspects, radar processor 836 may be configured to determine a first one-dimensional (1D) AoA spectrum corresponding to a first dimension of the Azimuth-Elevation domain, for example, based on the radar Rx data 811, e.g., as described below.

In some demonstrative aspects, radar processor 836 may be configured to determine a second 1D AoA spectrum corresponding to a second dimension of the Azimuth-Elevation domain, for example, based on the radar Rx data 811, e.g., as described below.

In some demonstrative aspects, the first dimension of the Azimuth-Elevation domain may include an azimuth dimension, and the second dimension of the Azimuth-Elevation domain may include an elevation dimension, e.g., as described below.

In other aspects, the first dimension of the Azimuth-Elevation domain may include the elevation dimension, and the second dimension of the Azimuth-Elevation domain may include the azimuth dimension.

In some demonstrative aspects, radar processor 836 may be configured to determine the first 1D AoA spectrum and the second 1D AoA spectrum, for example, according to a same spectrum analysis algorithm, e.g., as described below.

In some demonstrative aspects, radar processor 836 may be configured to determine the first 1D AoA spectrum, for example, according to a first spectrum analysis algorithm, and to determine the second 1D AoA spectrum, for example, according to a second spectrum analysis algorithm, which may be, for example, different from the first spectrum analysis algorithm, e.g., as described below.

In some demonstrative aspects, radar processor 836 may be configured to determine the first 1D AoA spectrum and/or the second 1D AoA spectrum, for example, according to a super resolution spectrum analysis algorithm, e.g., as described below.

In some demonstrative aspects, the super resolution spectrum analysis algorithm may include a Minimum Variance Distortionless Response (MVDR) algorithm, a Minimum Power Distortionless Response (MPDR) algorithm, or a Multiple Signal Classification (MUSIC) algorithm.

In other aspects, the super resolution spectrum analysis algorithm may include any other super resolution algorithm.

In some demonstrative aspects, radar processor 836 may be configured to determine the first 1D AoA spectrum and/or the second 1D AoA spectrum, for example, based on a super resolution algorithm utilizing a covariance matrix, e.g., as described below.

In some demonstrative aspects, radar processor 836 may be configured to determine a particular 1D AoA spectrum corresponding to a particular dimension of the first dimension and/or the second dimension, for example, by determining a covariance matrix corresponding to the particular dimension, and determining the particular 1D AoA spectrum according to the super resolution spectrum analysis algorithm, for example, based on the covariance matrix corresponding to the particular dimension, e.g., as described below.

In some demonstrative aspects, radar processor 836 may be configured to determine the covariance matrix corresponding to the particular dimension, for example, by applying to the radar Rx data 811 a Spatial Smoothing (SS) technique and/or a Forward-Backward (FB) technique, e.g., as described below.

In some demonstrative aspects, radar processor 836 may be configured to determine the covariance matrix corresponding to the particular dimension, for example, based on combined Rx data corresponding to a plurality of 1D antenna indexes in a first antenna dimension of the 2D radar antenna, e.g., as described below.

In some demonstrative aspects, the combined Rx data corresponding to a 1D antenna index in the first antenna dimension may be based on a combination of a plurality of data values in the radar Rx data 811, which correspond to the 1D antenna index in the first antenna dimension, e.g., as described below.

In some demonstrative aspects, the plurality of data values may correspond to a plurality of antenna indexes in a second antenna dimension of the 2D radar antenna, e.g., as described below.

In some demonstrative aspects, radar processor 836 may be configured to determine the first 1D AoA spectrum and/or the second 1D AoA spectrum, for example, according to a delay-and-sum algorithm, e.g., as described below.

In some demonstrative aspects, radar processor 836 may be configured to determine a particular 1D AoA spectrum corresponding to a particular dimension of the first dimension and/or the second dimension by determining a plurality of intermediate 1D AoA spectrums corresponding to a respective plurality of subarrays in the particular dimension of the 2D radar antenna, e.g., as described below.

In some demonstrative aspects, radar processor 836 may be configured to determine the particular 1D AoA spectrum based on a combination of the plurality of intermediate 1D AoA spectrums, e.g., as described below.

In some demonstrative aspects, the particular dimension may include the azimuth dimension, and the plurality of subarrays may include a plurality of rows of the 2D radar antenna.

In some demonstrative aspects, the particular dimension may include the elevation dimension, and the plurality of subarrays may include a plurality of columns of the 2D radar antenna.

In some demonstrative aspects, radar processor 836 may be configured to combine the plurality of intermediate 1D AoA spectrums, for example, such that the particular 1D AoA spectrum is generated with reduced, or even no, SNR loss.

In one example, radar processor 836 may be configured to determine the particular 1D AoA spectrum, by adding or multiplying the plurality of intermediate 1D AoA spectrums.

In other aspects, radar processor 836 may be configured to determine the first 1D AoA spectrum and/or the second 1D AoA spectrum, for example, according to any other additional or alternative algorithm, method and/or technique.

In some demonstrative aspects, radar processor 836 may be configured to detect one or more first object hypotheses in the first dimension, for example, based on the first 1D AoA spectrum, e.g., as described below.

In some demonstrative aspects, radar processor 836 may be configured to detect one or more second object hypotheses in the second dimension, for example, based on the second 1D AoA spectrum, e.g., as described below.

In some demonstrative aspects, radar processor 836 may be configured to determine the one or more first object hypotheses and the one or more second object hypotheses, for example, according to a same object detection scheme, e.g., as described below.

In some demonstrative aspects, radar processor 836 may be configured to determine the one or more first object hypotheses, for example, according to a first object detection scheme, and to determine the one or more second object hypotheses, for example, according to a second object detection scheme, which may be, for example, different from the first object detection scheme, e.g., as described below.

In some demonstrative aspects, radar processor 836 may be configured to determine a plurality of 2D object hypotheses corresponding to the Azimuth-Elevation domain, for example, based on the first object hypotheses and the second object hypotheses, e.g., as described below.

In some demonstrative aspects, radar processor 836 may be configured to determine the plurality of 2D object hypotheses, for example, based on a respective plurality of different combinations of a hypothesis from the first object hypotheses and a hypothesis from the second object hypotheses, e.g., as described below.

In some demonstrative aspects, radar processor 836 may be configured to generate the 2D AoA information, for example, based on a 2D AoA spectrum analysis of the radar Rx data 811, for example, according to the plurality of 2D object hypotheses, e.g., as described below.

In some demonstrative aspects, the 2D AoA spectrum analysis may include a super resolution spectrum analysis algorithm, e.g., as described below.

In some demonstrative aspects, the 2D AoA spectrum analysis may include a delay-and-sum algorithm, e.g., as described below.

In some demonstrative aspects, the 2D AoA spectrum analysis may include a maximum-likelihood (ML) algorithm, e.g., as described below.

In other aspects, the 2D AoA spectrum analysis may include any other additional or alternative algorithm, method and/or technique.

In some demonstrative aspects, radar processor 836 may be configured to generate the 2D AoA information configured for a Field of View (FOV) parameter and/or a resolution parameter, e.g., as described below.

In some demonstrative aspects, a count of the plurality of 2D object hypotheses may be less than 10% of a count of points in the Azimuth-Elevation domain, for example, according to the FOV parameter and the resolution parameter, e.g., as described below.

In some demonstrative aspects, the count of the plurality of 2D object hypotheses may be less than 5% of the count of points in the Azimuth-Elevation domain, for example, according to the FOV parameter and the resolution parameter, e.g., as described below.

In some demonstrative aspects, the count of the plurality of 2D object hypotheses may be less than 1% of the count of points in the Azimuth-Elevation domain, for example, according to the FOV parameter and the resolution parameter, e.g., as described below.

In other aspects, any other count of the plurality of 2D object hypotheses may be implemented.

In some demonstrative aspects, radar processor 836 may be configured to determine a selected AoA spectral points, for example, based on the 2D AoA spectrum analysis, e.g., as described below.

In some demonstrative aspects, radar processor 836 may be configured to determine a plurality of AoA spectral points, for example, based on the 2D AoA spectrum analysis, e.g., as described below.

In some demonstrative aspects, radar processor 836 may be configured to identify one or more selected AoA spectral points from the plurality of AoA spectral points, for example, based on a detection threshold, e.g., as described below.

In some demonstrative aspects, radar processor 836 may be configured to generate the 2D AoA information including 2D AoA information corresponding to the selected AoA spectral points, e.g., as described below.

In some demonstrative aspects, radar processor 836 may be configured to dynamically set the detection threshold, for example, based on one or more detection criteria, e.g., as described below.

In some demonstrative aspects, radar processor 836 may be configured to determine a candidate set of 2D object hypotheses, for example, based on the first object hypotheses and the second object hypotheses, e.g., as described below.

In some demonstrative aspects, radar processor 836 may be configured to determine a reduced candidate set of 2D object hypotheses by excluding one or more 2D object hypotheses from the candidate set of 2D object hypotheses, for example, based on at least one exclusion criterion, e.g., as described below.

In one example, the exclusion criterion may be based, for example, on geometrical considerations.

In another example, the exclusion criterion may be based, for example, on one or more regions of the Azimuth-Elevation domain, e.g., one or more Regions of Interest (ROIs).

In another example, any other exclusion criterion may be implemented.

In some demonstrative aspects, radar processor 836 may be configured to generate the 2D AoA information, for example, based on the 2D AoA spectrum analysis of the radar Rx data 811 according to the reduced candidate set of 2D object hypotheses, e.g., as described below.

In some demonstrative aspects, radar processor 836 may be configured to identify one or more regions of the Azimuth-Elevation domain, for example, the ROIs, e.g., as described below.

In some demonstrative aspects, radar processor 836 may be configured to determine at least one 1D AoA spectrum of the first 1D AoA spectrum and/or the second 1D AoA spectrum, for example, in only the one or more regions of the Azimuth-Elevation domain, e.g., as described below.

In some demonstrative aspects, radar processor 836 may be configured to identify the one or more regions, for example, based on a coarse AoA spectrum analysis of the Rx radar data 811, e.g., as described below.

In one example, the coarse AoA spectrum analysis may include a 1D coarse AoA spectrum analysis corresponding to a dimension of the Azimuth-Elevation domain.

In one example, the coarse AoA spectrum analysis may include a 2D coarse AoA spectrum analysis corresponding to the Azimuth-Elevation domain.

In some demonstrative aspects, a resolution of the coarse AoA spectrum analysis may be lower than a resolution of the 1D AoA spectrum, e.g., as described below.

In some demonstrative aspects, radar processor 836 may be configured to identify the one or more regions, for example, based on map information, scene occlusions, a planned maneuver, a trajectory, and/or a Transmit (Tx) Beamforming (BF) configuration, e.g., as described below.

In one example, the map information may include high definition map information.

In one example, the Tx BF configuration may define one or more parts of the FOV, to which energy may be focused, for example, by applying a spatial filter. Accordingly, radar processor 836 may be configured to identify the one or more regions to include regions of the Azimuth-Elevation domain, to which the energy is focused based on the Tx BF configuration, for example, while excluding parts of the FOV, to which the energy is not focused according to the Tx BF configuration.

In some demonstrative aspects, radar processor 836 may be configured to identify the one or more regions, for example, based on information from higher layers and/or applications e.g., of radar device 101 (FIG. 1).

In some demonstrative aspects, radar processor 836 may be configured to identify the one or more regions, for example, based on a planned maneuver or a trajectory, e.g., of vehicle 100 (FIG. 1).

In some demonstrative aspects, the coarse AoA spectrum analysis may be optional. For example, radar processor 836 may determine the 1D AoA spectrums of the first 1D AoA spectrum and/or the second 1D AoA spectrum, for example, even without performing the coarse AoA spectrum analysis.

In some demonstrative aspects, radar processor 836 may be configured to determine the first 1D AoA spectrum, the second 1D AoA spectrum, and/or the 2D AoA information, for example, according to a predefined coordinate system, e.g., as described below.

In some demonstrative aspects, radar processor 836 may be configured to determine the first 1D AoA spectrum, the second 1D AoA spectrum, and/or the 2D AoA information for example, according to a coupled coordinate system, e.g., as described below.

In one example, the coupled coordinate system may include a degree-based coordinate system.

In another example, the coupled coordinate system may include any other coordinate system.

In some demonstrative aspects, radar processor 836 may be configured to determine the second 1D AoA spectrum based on the one or more first object hypotheses in the first dimension based on the first 1D AoA spectrum, e.g., as described below.

In one example, radar processor 836 may be configured to determine the second 1D AoA spectrum based on the one or more first object hypotheses in the first dimension.

In one example, there may be a coupling between values in the first dimension and values in the second dimension of the coupled coordinate system. For example, due to this coupling the first and second 1D AoA spectrums may be determined sequentially, for example, by determining the first 1D AoA spectrum, and then determining the second 1D AoA spectrum based on the first 1D AoA spectrum.

In one example, the 1D AoA spectrum corresponding to the azimuth domain may be determined, followed by determining the 1D AoA spectrum corresponding to the elevation domain, for example, based on the 1D AoA spectrum corresponding to the azimuth domain. In another example, the 1D AoA spectrum corresponding to the elevation domain may be determined, followed by determining the 1D AoA spectrum corresponding to the azimuth domain, for example, based on the 1D AoA spectrum corresponding to the elevation domain.

In some demonstrative aspects, radar processor 836 may be configured to determine the first 1D AoA spectrum, the second 1D AoA spectrum, and/or the 2D AoA information, for example, according to a non-coupled coordinate system, e.g., as described below.

In one example, the non-coupled coordinate system may include a UV coordinate system, e.g., as described below.

In another example, any other non-coupled coordinate system may be used.

In one example, values of the first dimension and values in the second dimension may be independent from another, for example, when represented in the non-coupled coordinate system. For example, there may be no coupling between values in the first dimension and values in the second dimension. For example, this may support determining the first 1D AoA spectrum independent from determining the second 1D AoA spectrum. Accordingly, the first 1D AoA spectrum and the second AoA spectrum may be determined in parallel, or partially in parallel.

In one example, a target, denoted T, may be represented by a point in a coordinate system (X, Y, Z), where the X-axis may point to the right and may represents the azimuth dimension, the Y-axis may point forward and may represent the boresight, and the Z-axis may point up and may represent the elevation dimension. For example, a radar array may lie in the X-Z plane, and a zero value may be at the boresight. According to this example, the target T may be represented by the coordinates T(R, θ, φ), wherein R denotes a range of the target from the origin, θ denotes an angle of a projection of R on the X-Y plane, and φ denotes an angle of a projection of R on the Z-Y plane.

In some demonstrative aspects, the projection of the target T on the X-Y plane may be represented by R cos(φ)sin(θ), and/or the projection the target T on the Z-Y plane may be represented by R sin(φ).

In some demonstrative aspects, the range R may be known, for example, according to a range-Doppler bin of an AoA. Accordingly, an azimuth vector, denoted "Az_Vector", and an elevation vector, denoted "El_Vector", of the target T may be determined, e.g., as follows:

Az_Vector=cos(φ)sin(θ),

El_Vector=sin(φ).

In some demonstrative aspects, a uniform grid may be set for the angles φ and θ, for example, in a coupled coordinate system, e.g., a degree-based coordinate system, for example, φ=−30:0.5:30 and θ=−60:0.5:60.

In some demonstrative aspects, a uniform grid in the trigonometric domain may be set for the angles φ and θ, for example, in a non-coupled coordinate system, e.g., a UV-based coordinate system, e.g., u=cos(φ)sin(θ), v=sin(φ). Accordingly, u=−1:0.05:1 and v=−1:0.05:1, e.g., may be equal to a +/−90 degree FOV, or u=−0.8:0.05:0.8 and v=−0.5:0.05:0.5, e.g., may be used for a FOV less than +/−90 degrees.

In some demonstrative aspects, the UV coordinate system may provide a larger coordinate spacing, for example, when approaching edges of the FOV, e.g., where a radar is less accurate, which may result in a reduced number of hypotheses to check.

In some demonstrative aspects, the UV coordinate system may result in a linear term in a steering vector, e.g., the term exp( ), which may reduce complexity, for example, in a Fast Fourier Transform (FFT) and/or other implementations and/or computations using the steering vector.

Figure 9:
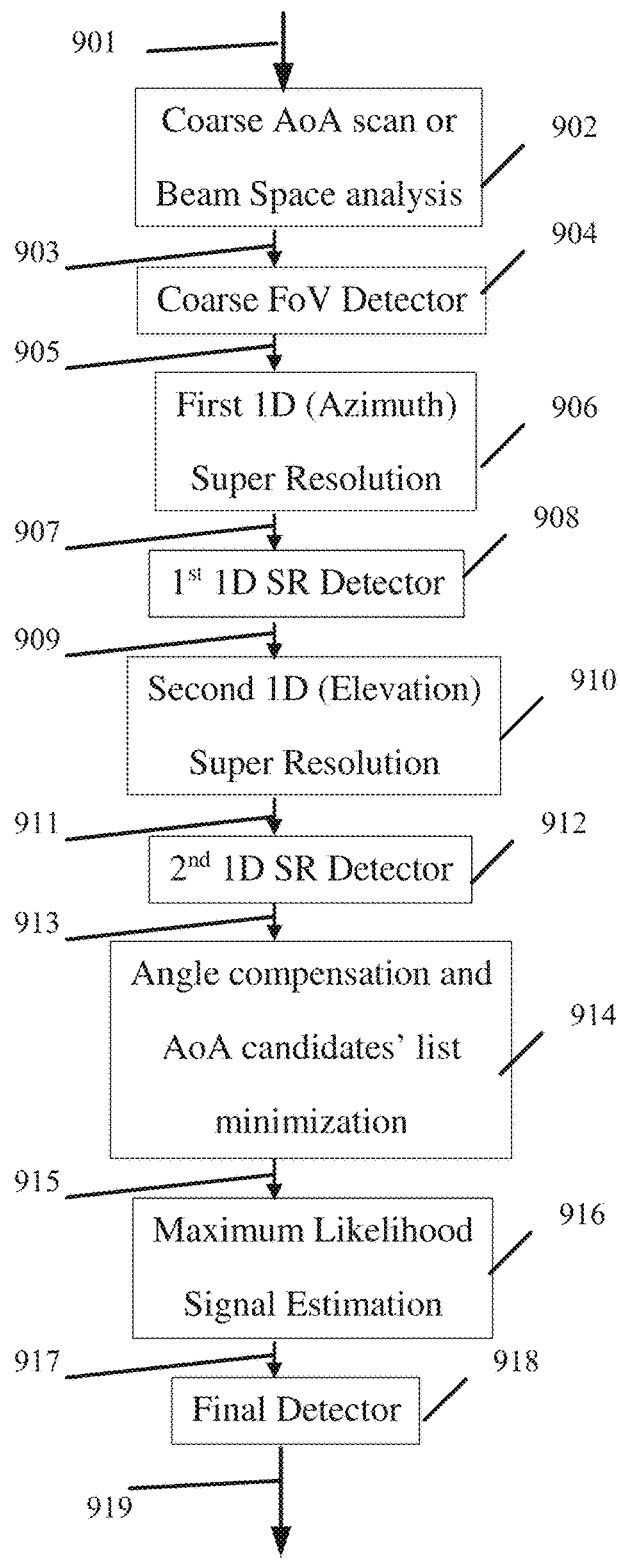
FIG. 9 is a schematic illustration of a method of generating two-dimensional (2D) Angle of Arrival (AoA) information, in accordance with some demonstrative aspects.

Reference is made to FIG. 9, which schematically illustrates a method of generating 2D AoA information, in accordance with some demonstrative aspects. For example, one or more of the operations of the method of FIG. 9 may be performed by a radar processor, e.g., radar processor 836 (FIG. 8).

In some demonstrative aspects, as indicated at block 902, the method may include performing a coarse AoA spectrum analysis on radar Rx data 901, for example, over a FOV, e.g., over an entire FOV, for example, to provide a coarse AoA Spectrum 903, e.g., of a FOV. For example, radar processor 834 (FIG. 8) may apply the coarse AoA spectrum analysis to the radar Rx data 811 (FIG. 8), for example, to output the coarse AoA Spectrum 903, e.g., as described above.

In one example, the coarse AoA Spectrum 903 may have a reduced or a lower resolution, e.g., compared to the 1D AoA spectrum described above.

In some demonstrative aspects, the coarse AoA spectrum analysis of the FOV may include, for example, a Windowed Bartlett Beamforming (BF).

In some demonstrative aspects, the coarse AoA spectrum analysis of the FOV may include, for example, applying a super resolution algorithm to a sub array of a radar antenna. For example, applying the super resolution algorithm to the sub array may result in reduced complexity.

In some demonstrative aspects, the coarse AoA spectrum analysis of the FOV may include, for example, applying a super resolution algorithm to the sub array, for example, according to a reduced hypotheses grid, which may result in a further reduction of the complexity.

In some demonstrative aspects, the super resolution algorithm may be suitable, for example, for a sparse array topology.

In some demonstrative aspects, the super resolution algorithm may include, for example, a MUSIC algorithm, an Amplitude and Phase EStimation (APES) algorithm, an MVDR algorithm, and/or any other super resolution algorithm.

In one example, a spatial Smoothing technique and/or a Forward-Backward technique may be implemented for the one or more super-resolution algorithms, e.g., the MUSIC algorithm and/or the MVDR algorithm, for example, for supporting single-shot processing, e.g., as described below.

In some demonstrative aspects, the coarse AoA spectrum analysis of the FOV may include, for example, a Beam-Space analysis.

In some demonstrative aspects, the coarse AoA spectrum analysis may be optional, and may include a coarse scan of an entire FOV, for example, to detect parts of the FOV, e.g., ROIs, that may be subject for further super resolution processing, e.g., as described below.

In some demonstrative aspects, the coarse AoA spectrum analysis of the FOV may be based, for example, on information on one or more regions, e.g., ROIs, for example, from upper layers and/or applications, e.g., of radar device 101 (FIG. 1).

In some demonstrative aspects, as indicated at block 904, the method may include detecting one or more regions 905 of the coarse AoA Spectrum 903. For example, radar processor 834 (FIG. 8) may identify the one or more regions 905 based on the coarse AoA spectrum analysis.

In some demonstrative aspects, radar processor 834 (FIG. 8) may determine the one or more regions 905, for example, using a signal versus noise detector, a Generalized Likelihood Ratio Test (GLRT), and/or any other peak detector.

In some demonstrative aspects, as indicated at block 906, the method may include determining a first 1D AoA spectrum 907 corresponding to a first dimension of the Azimuth-Elevation domain, e.g., the azimuth domain, according to the one or more regions 905. For example, radar processor 834 (FIG. 8) may determine the first 1D AoA spectrum 907 according to the one or more regions 905.

In some demonstrative aspects, blocks 902 and 904 may be optional. For example, in some implementations, the method may be operated to being at block 906. For example, radar processor 834 (FIG. 8) may determine the first 1D AoA spectrum 907 based on radar Rx data 901, e.g., with respect to the entire FOV.

In one example, determining the first 1D AoA spectrum 907 may leverage measurements of an entire array. This may be done on an entire FOV or just on coordinates, e.g., angle coordinates and/or UV coordinates, within the ROIs.

In some demonstrative aspects, radar processor 834 (FIG. 8) may determine the first 1D AoA spectrum 907, for example, by processing the Rx data 811 over the entire array, e.g., instead of row by row or column by column.

In some demonstrative aspects, radar processor 834 (FIG. 8) may determine the first 1D AoA spectrum 907, for example, based on an AoA spectrum analysis algorithm.

In one example, radar processor 834 (FIG. 8) may determine the first 1D AoA spectrum 907, for example, based on a super resolution algorithm, which may provide improved performance.

In one example, a non-iterative super resolution algorithm, e.g., a MUSIC algorithm or the like, may be preferred, for example, to reduce complexity.

In some demonstrative aspects, radar processor 834 (FIG. 8) may apply the super resolution algorithm over the entire array, for example, instead of by row or column by column, e.g., to retain an SNR. However, a reduced steering vector size of the super resolution algorithm may be used, e.g., to reduce computation complexity.

In some demonstrative aspects, radar processor 834 (FIG. 8) may be configured to apply a 2D to 1D reduction with respect to the radar Rx data 811, which includes an entire 2D array measurement.

For example, radar processor 834 (FIG. 8) may apply the 2D to 1D reduction by applying to the radar Rx data 811 a Spatial Smoothing technique and/or the Forward-Backward technique, for example, to build a covariance matrix to be used in the super-resolution algorithm, e.g., the MUSIC algorithm, a Minimum-Power Distortionless Response (MPDR) algorithm and/or any other SR algorithm.

In some demonstrative aspects, the Spatial Smoothing (SS) and/or Forward-Backward (FB) (SSFB) techniques may be suitable for a symmetric and uniform or quasi-uniform antenna array.

In one example, the SSFB may include one or more of the following operations:
  Assume that the 1D AoA spectrum (azimuth) is along array lines of measurements of a radar antenna.
  Select an SS order, e.g., a size of a sub-array, for example, according to fixed setting, heuristics, or dynamically, e.g., through an evaluation of a signal space size.
  Perform an SSFB method for each line, yielding SSFB(i) matrix for line i. an SSFB(i) matrix size may be equal to (sub-array steering vector length)*(2*number of sub-arrays)
  A matrix, denoted R_sub, may be a concatenation of SSFB(i) matrices of all lines, e.g., as follows:
  R_sub=[SSFB(1), SSFB(2), . . . , SSFB(N)], where N is a number of lines in the array
  Multiply the matrix R_sub with itself to determine a measurements-based estimation for a Covariance matrix R, e.g., R=R_sub*R_sub$^H$, i.e., R_sub*Hermitian(R_sub)
  The covariance matrix R may be used, e.g., after inversion in a super resolution algorithm, e.g., the MUSIC algorithm, the MPDR algorithm, or any other non-iterative super resolution algorithm having 2D measurements information.

In other aspects, the SSFB may include any other additional or alternative operations.

In some demonstrative aspects, as indicated at block 908, the method may include detecting one or more first object hypotheses 909 in the first dimension (azimuth) based on the first 1D AoA spectrum 907. For example, radar processor 834 (FIG. 8) may detect the one or more first object hypotheses 909 based on the first 1D AoA spectrum 907.

In one example, radar processor 834 (FIG. 8) may determine the one or more first object hypotheses 909, for example, according to a peak detector.

In some demonstrative aspects, as indicated at block 910, the method may include determining a second 1D AoA spectrum 911 corresponding to a second dimension of the Azimuth-Elevation domain, e.g., the elevation domain, for example, based on the Radar Rx data, e.g., over the one or more regions 905, or over the entire FOV. For example, radar processor 834 (FIG. 8) may determine the second 1D AoA spectrum 911.

In one example, determining the second 1D AoA spectrum 911 may leverage measurements of an entire array. This may be done on an entire FOV or just on coordinates, e.g., angle coordinates and/or UV coordinates, within the ROIs, In some demonstrative aspects, radar processor 834 (FIG. 8) may determine the second 1D AoA spectrum 911, for example, by processing the entire array, e.g., instead of row by row or column by column.

In some demonstrative aspects, blocks 902 and 904 may be optional. For example, in some aspects, radar processor 834 (FIG. 8) may determine the second 1D AoA spectrum 911 based on radar Rx data 901 with respect to the entire FOV.

In some demonstrative aspects, radar processor 834 (FIG. 8) may determine the second 1D AoA spectrum 911, for example, based on an AoA spectrum analysis algorithm.

In some demonstrative aspects, radar processor 834 (FIG. 8) may determine the second 1D AoA spectrum 911, for example, using a same AoA spectrum analysis algorithm used to determine the first 1D AoA spectrum 907.

In some demonstrative aspects, radar processor 834 (FIG. 8) may determine the second 1D AoA spectrum 911, for example, using a different AoA spectrum analysis algorithm from the AoA spectrum analysis algorithm used to determine the first 1D AoA spectrum 907.

In one example, the AoA spectrum analysis algorithm for the second 1D AoA spectrum 911 may be different from the AoA spectrum analysis algorithm for the first 1D AoA spectrum 907, for example, with respect to a Hypothesis grid resolution, an SS order selected method and/or value, and/or with respect to any other parameters and/or methods.

In some demonstrative aspects, as indicated at block 912, the method may include detecting one or more second object hypotheses 913 in the second dimension (elevation), for example, based on the second 1D AoA spectrum 911. For example, radar processor 834 (FIG. 8) may detect the one or more second object hypotheses 913 based on the second 1D AoA spectrum 911.

In one example, radar processor 834 (FIG. 8) may determine the one or more first object hypotheses 909, for example, using a peak detector.

In some demonstrative aspects, radar processor 834 (FIG. 8) may determine the one or more second object hypotheses 913, for example, using a same peak detector used to detect the one or more first object hypotheses 909.

In some demonstrative aspects, radar processor 834 (FIG. 8) may determine the one or more second object hypotheses 913, for example, using a different peak detector from the peak detector used to detect the one or more first object hypotheses 909.

In some demonstrative aspects, radar processor 834 (FIG. 8) may determine the one or more second object hypotheses 913, for example, based on a combination of a peak detector followed by a signal versus noise detector, e.g., a GLRT detector, and/or any other detector.

In some demonstrative aspects, the one or more second object hypotheses 913 and the one or more first object hypotheses 909 may be used as candidates for a reduced candidate set of 2D object hypotheses, e.g., as described below.

In some demonstrative aspects, as indicated at block 914, the method may include determining a reduced candidate set of 2D object hypotheses 915 based on the first object hypotheses 909 and the second object hypotheses 913.

For example, radar processor 834 (FIG. 8) may determine a candidate set of 2D object hypotheses based on the first object hypotheses 909 and the second object hypotheses 913, and may determine the reduced candidate set of 2D object hypotheses 915 by excluding one or more 2D object hypotheses from the candidate set of 2D object hypotheses based on at least one exclusion criterion, e.g., as described below.

In some demonstrative aspects, radar processor 834 (FIG. 8) may determine the reduced candidate set of 2D object hypotheses, for example, by removing 2D object hypotheses that may be outside the FOV.

In some demonstrative aspects, radar processor 834 (FIG. 8) may determine the reduced candidate set of 2D object hypotheses, for example, by removing 2D object hypotheses that may not be aligned with the coarse analysis phase 902, e.g., hypotheses which are outside the one or more regions 905.

In some demonstrative aspects, radar processor 834 (FIG. 8) may determine the reduced candidate set of 2D object hypotheses, for example, by removing angle hypotheses that may not be possible due to one or more criteria, e.g., with respect to a specific platform, with respect to an antenna design, with respect to a beam pattern of antenna elements, with respect to an application usage, according to higher layers directives and/or any similar heuristics or system constraints.

In one example, the candidate set of 2D object hypotheses may be processed to remove ambiguity, for example, by a conditional joint 2D processing, for example, only on the candidate set of 2D object hypotheses and a resulting signal strength evaluation.

Figure 10A:
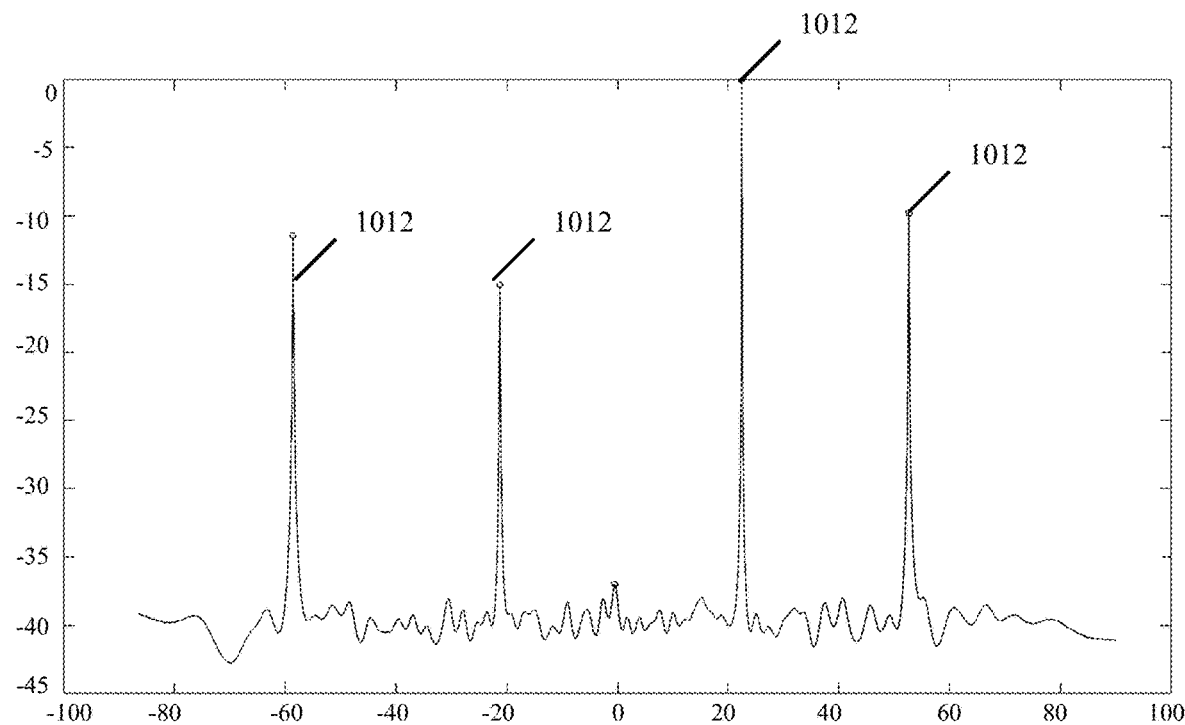
FIG. 10A is a schematic illustration of a first one-dimensional (1D) AoA spectrum.
Figure 10B:
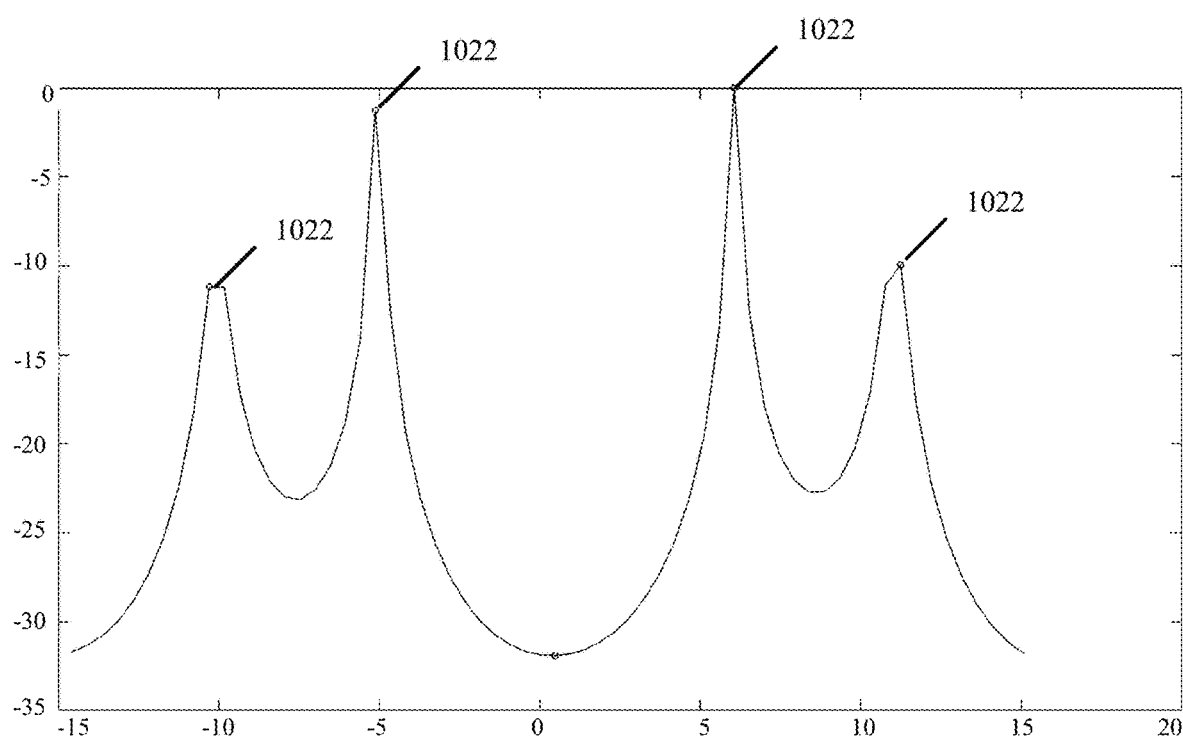
FIG. 10B is a schematic illustration of a second one 1D AoA spectrum, in accordance with some demonstrative aspects.

Reference is made to FIG. 10A, which schematically illustrates a first 1D AoA spectrum 1010, and to FIG. 10B, which schematically illustrates a second 1D AoA spectrum 1020, in accordance with some demonstrative aspects.

In some demonstrative aspects, first 1D AoA spectrum 1010 may correspond to the Azimuth dimension.

In one example, radar processor 834 (FIG. 8) may determine one or more object hypotheses 1012 based on detected peaks in the 1D AoA spectrum 1010. For example, the one or more object hypotheses 1012 may represent the one or more first object hypotheses 909 (FIG. 9).

In some demonstrative aspects, second 1D AoA spectrum 1020 may correspond to the elevation dimension.

In one example, radar processor 834 (FIG. 8) may determine one or more object hypotheses 1022 based on detected peaks in the 1D AoA spectrum 1020. For example, the one or more object hypotheses 1022 may represent the one or more second object hypotheses 913 (FIG. 9).

In some demonstrative aspects, radar processor 834 (FIG. 8) may determine a plurality of 2D object hypotheses, e.g., plurality of 2D object hypotheses based on a respective plurality of different combinations of a hypothesis 1012 from the first object hypotheses 1012 and a hypothesis 1022 from the second object hypotheses 1022.

In one example, as shown in FIG. 10A, the one or more object hypotheses 1012 may include 4 object hypotheses; and, as shown in FIG. 10B, the one or more object hypotheses 1022 may include 4 object hypotheses. According to this example, the candidate set of 2D object hypotheses may include 16 2D object hypotheses, for example, based on all possible 16 combinations between the 4 object hypotheses 1012 and the 4 hypotheses 1022.

Referring back to FIG. 9, in some demonstrative aspects, the operations of blocks 906, 908, 910 and/or 912, may be performed, for example, with respect to a data representation in a non-coupled coordinate system, e.g., the UV coordinate system, or any other non-coupled coordinate system.

In some demonstrative aspects, the operations of blocks 906, 908, 910 and/or 912, may be performed, for example, with respect to a data representation in a coupled coordinate system, e.g., a degree-based coordinate system.

In some demonstrative aspects, the operations of blocks 910 and 912 may be performed independently from, and/or in parallel to, the operations of blocks 906 and 908, for example, when utilizing the non-coupled coordinate system or the coupled coordinate system.

In some demonstrative aspects, the operations of blocks 910 and 912 may be sequentially performed after the operations of blocks 906 and 908, for example, when utilizing the coupled coordinate system or the non-coupled coordinate system.

In one example, there may be a coupling between Elevation and Azimuth angles, for example, in the degree-based coordinate system, e.g., as opposed to the UV coordinate system.

In some demonstrative aspects, an angle compensation may be determined, for example, with respect to the degree-based coordinate system. For example, this angle compensation may not be applied with respect to the UV coordinate system.

In one example, when an estimated azimuth vector is represented as Az_vec=cos($\varphi$)sin($\theta$), the term $\sin^{-1}$(Az_Vec) may not be equal to the angle $\theta$. According to this example, it may be preferred to determine $\sin^{-1}$(Az_Vec/cos($\varphi$)), for example, in order to determine an estimate of $\theta$.

In one example, if $\varphi$ is small and around the origin, it may be assumed that cos($\varphi$)~1. For example, cos($\varphi$) may be estimated from cos($\sin^{-1}$(El_vec)).

In some demonstrative aspects, as indicated at block 916, the method may include performing a 2D AoA spectrum analysis of the radar Rx data 901, for example, according to the reduced candidate set of 2D object hypotheses 915, to generate a plurality of AoA spectral points 917. For example, radar processor 834 (FIG. 8) may generate the plurality of AoA spectral points 917, for example, based on the 2D AoA spectrum analysis 916 of the radar Rx data 901 according to the reduced candidate set of 2D object hypotheses 915, e.g., as described below.

In one example, radar processor 834 (FIG. 8) may generate the plurality of AoA spectral points 917, for example, by applying a 2D AoA spectrum analysis method to an entire 2D array for an estimation, which may be equal to or better than a 1D AoA estimation method used to estimate the first 1D AoA spectrum and/or the second 1D AoA spectrum. For example, using a method with reduced performance compared to the 1D AoA estimation method may result in degraded overall performance.

In some demonstrative aspects, radar processor 834 (FIG. 8) may generate the plurality of AoA spectral points 917, for example, by applying a 2D super resolution algorithm, e.g., using a larger array aperture than the 1D AoA estimation method, for example, when a sub-array is used to estimate the first 1D AoA spectrum and/or the second 1D AoA spectrum.

In some demonstrative aspects, radar processor 834 (FIG. 8) may generate the plurality of AoA spectral points 917, for example, based on a Maximum Likelihood (ML) signal estimation, e.g., as described above.

In one example, the ML signal estimation may be optimal for un-biased estimators, and, therefore may be preferred in some use cases. In other aspects, any other 2D AoA estimation method may be applied.

In one example, in some use cases, the ML signal estimation may be advantageous, e.g., compared to other 2D AoA spectrum analysis methods, for example, since a detection magnitude may be optimally estimated by the signal estimation.

In another example, the ML signal estimation may output an optimal estimation of a target reflection signal, and, accordingly, soft values may be delivered to a detector and/or higher layers or for one or more high-level applications, e.g., better processing, a track before detect, Artificial Intelligence (AI) classification and tracking, and/or the like.

In some demonstrative aspects, as indicated at block 918, the method may include identifying one or more selected AoA spectral points from the plurality of AoA spectral points 917 based on a detection threshold to generate 2D AoA information 919. For example, radar processor 834 (FIG. 8) may identify the one or more selected AoA spectral points of the plurality of AoA spectral points 917 based on a detection threshold, and may generate the 2D AoA information 919 including 2D AoA information corresponding to the selected AoA spectral points, e.g., as described above.

In some demonstrative aspects, radar processor 834 (FIG. 8) may generate the 2D AoA information 919, for example, based on a noise variance estimation, e.g., using a final detector.

In some demonstrative aspects, the final detector may be optional and/or may be performed by higher layers of radar device 101 (FIG. 1).

In some demonstrative aspects, radar processor 834 (FIG. 8) may approve or reject as a ghost ambiguity one or more of the plurality of AoA spectral points 917.

In some demonstrative aspects, the 2D AoA information 919 of the selected AoA spectral points may include magnitudes and/or coordinates of detected signals.

In some demonstrative aspects, the 2D AoA information 919 may include, for example, an AoA detection list, for example, in opposed to a 2D AoA spectrum.

In some demonstrative aspects, radar processor 834 (FIG. 8) may generate the 2D AoA information 919, for example, based on a coarse 2D AoA estimation, for example, if targets are sparse in the FOV.

In one example, a coarse AoA analysis, e.g., as described above with reference to block 902, may be performed, for example, before generating the 2D AoA information 919, for example, to reduce the candidate list size. For example, the coarse AoA analysis may be performed before generating the 2D AoA information 919, for example, in addition to, or instead of, the AoA coarse analysis before the operation of block 904.

In some demonstrative aspects, radar processor 834 (FIG. 8) may generate the 2D AoA information 919, for example, based on any other additional or alternative algorithm, or a combination of the 2D AoA estimation algorithms described above.

In some demonstrative aspects, radar processor 834 (FIG. 8) may produce the candidate set of the plurality of AoA spectral points 917, e.g., with an ambiguity, and, may then remove ambiguous results from the list to generate the 2D AoA information 919.

In some demonstrative aspects, the method described above may provide one or more advantages over other 2D AoA spectrum analysis methods, e.g., as described below.

In one example, the 2D AoA estimation method described above may provide an increased 2D resolution performance and a low complexity, for example, which may be similar to a classical Bartlett Beam Forming filtering.

In another example, the 2D AoA estimation method described above may be suitable for sparse arrays, e.g., including sets, clusters or groups (sub arrays) having a same topology. According to this example, the coarse AoA analysis may be performed based on a coarse MVDR or other super resolution method, e.g., as opposed to a Bartlett BF method.

In another example, the 2D AoA estimation method described above may be suitable for any other antenna array, for example, a widely separated array and/or a multi-static radar system, for example, where relative phase information may be resolved.

In some demonstrative aspects, the 2D AoA estimation method described above may support an implementation with reduced computational complexity, for example, compared to other 2D AoA spectrum analysis methods, e.g., as described below.

In some demonstrative aspects, the reduced computational complexity may be achieved, for example, based on the ability to perform super resolution processing, e.g., at blocks 906, 910 and 916, for example, only on areas of interest of the FOV, e.g., the ROIs, for example, instead of the entire FOV.

In some demonstrative aspects, the reduced computational complexity may be achieved, for example, based on the ability to perform the operations indicated at blocks 906, 910 and 916, for example even without iterations.

In some demonstrative aspects, the reduced computational complexity may be achieved, for example, based on the ability to perform separable phases, each phase including only a single matrix inversion.

In some demonstrative aspects, the reduced computational complexity may be achieved, for example, based on the ability to perform the 1D AoA processing, for example, at blocks 906 and 910, e.g., once per dimension.

In some demonstrative aspects, the reduced computational complexity may be achieved, for example, based on the ability to perform the ML refinement process, at block 916, for example, on a relatively small number of AoA candidates, e.g., the selected AoA spectral points and/or the plurality of AoA spectral points 917.

Figure 11:
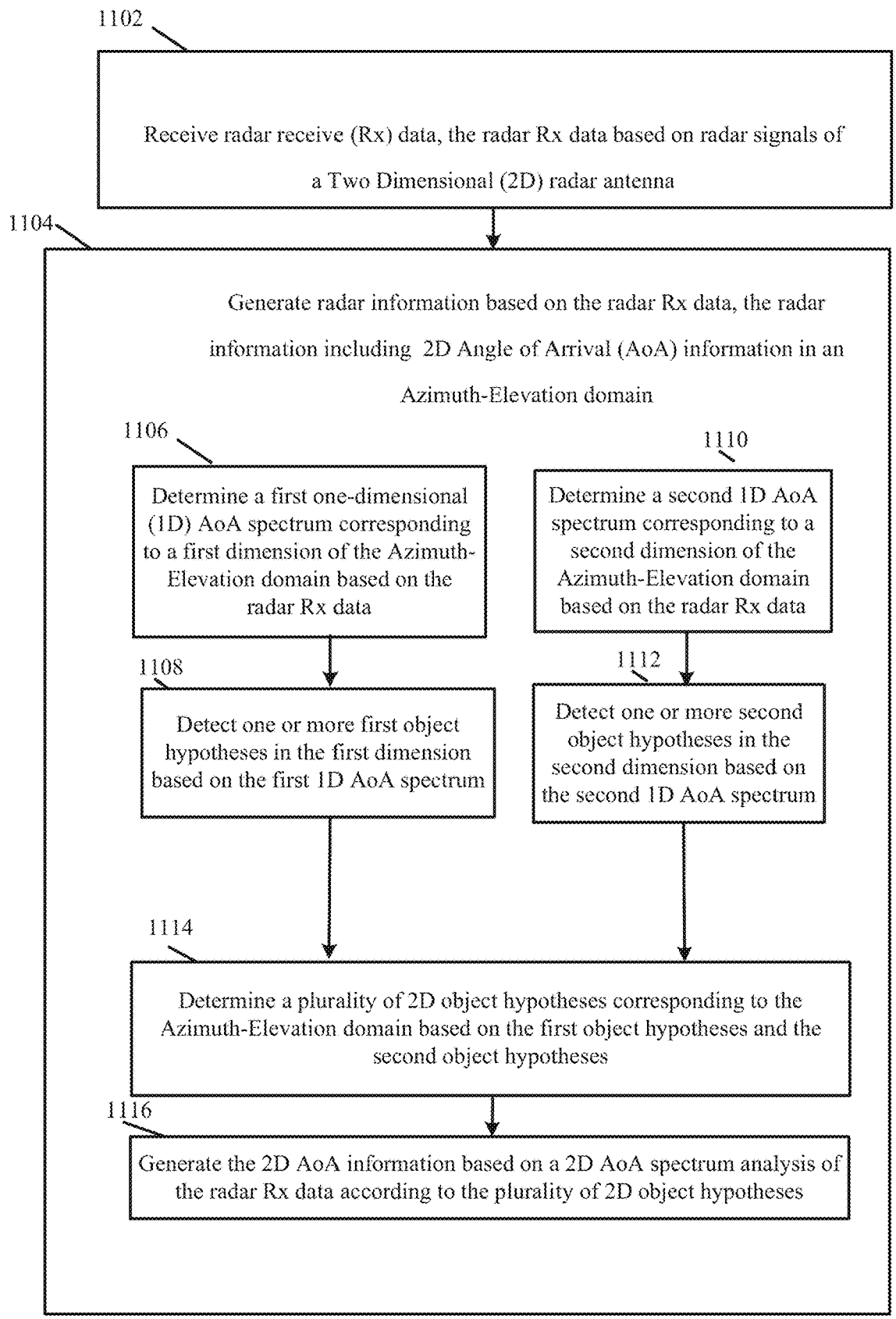
FIG. 11 is a schematic-flow chart illustration of a method of generating 2D AoA information, in accordance with some demonstrative aspects.
Figure 12:
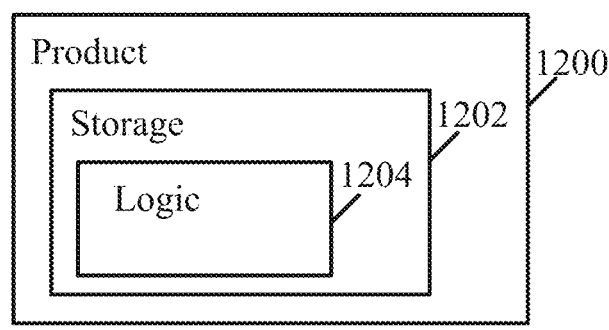
FIG. 12 is a schematic illustration of a product of manufacture, in accordance with some demonstrative aspects.

Reference is made to FIG. 11, which schematically illustrates a method of generating 2D AoA information, in accordance with some demonstrative aspects. For example, one or more of the operations of the method of FIG. 11 may be performed by a radar processor, e.g., radar processor 836 (FIG. 8).

As indicated at block 1102, the method may include receiving radar Rx data, the radar Rx data based on radar signals of a 2D radar antenna. For example, radar processor 836 (FIG. 8) may receive, e.g., via input 832 (FIG. 8), the radar Rx data 811 (FIG. 8), which is based on the radar signals received via radar antenna 881 (FIG. 8), e.g., as described above.

As indicated at block 1104, the method may include generating radar information based on the radar Rx data, the radar information including 2D AoA information in an Azimuth-Elevation domain. For example, radar processor 836 (FIG. 8) may generate radar information 813 (FIG. 8) including the 2D AoA information in the Azimuth-Elevation domain, e.g., as described above.

As indicated at block 1106, generating the radar information may include determining a first 1D AoA spectrum corresponding to a first dimension of the Azimuth-Elevation domain based on the radar Rx data. For example, radar processor 836 (FIG. 8) may determine the first 1D AoA spectrum corresponding to the first dimension of the Azimuth-Elevation domain based on the radar Rx data 811 (FIG. 8), e.g., as described above.

As indicated at block 1108, generating the radar information may include detecting one or more first object hypotheses in the first dimension based on the first 1D AoA spectrum. For example, radar processor 836 (FIG. 8) may detect the one or more first object hypotheses in the first dimension based on the first 1D AoA spectrum, e.g., as described above.

As indicated at block 1110, generating the radar information may include determining a second 1D AoA spectrum corresponding to a second dimension of the Azimuth-Elevation domain based on the radar Rx data. For example, radar processor 836 (FIG. 8) may determine the second 1D AoA spectrum corresponding to the second dimension of the Azimuth-Elevation domain based on the radar Rx data 811 (FIG. 8), e.g., as described above. In other aspects, the second 1D AoA spectrum may be determined independently from, e.g., in parallel to, the determination of the first 1D AoA spectrum, e.g., as described above. In other aspects, the second 1D AoA spectrum may be determined based on the first 1D AoA spectrum, e.g., as described above.

As indicated at block 1112, generating the radar information may include detecting one or more second object hypotheses in the second dimension based on the second 1D AoA spectrum. For example, radar processor 836 (FIG. 8) may detect the one or more second object hypotheses in the second dimension based on the second 1D AoA spectrum, e.g., as described above.

As indicated at block 1114, generating the radar information may include determining a plurality of 2D object hypotheses corresponding to the Azimuth-Elevation domain based on the first object hypotheses and the second object hypotheses. For example, radar processor 836 (FIG. 8) may determine the plurality of 2D object hypotheses corresponding to the Azimuth-Elevation domain based on the first object hypotheses and the second object hypotheses, e.g., as described above.

As indicated at block 1116, generating the radar information may include generating the 2D AoA information based on a 2D AoA spectrum analysis of the radar Rx data according to the plurality of 2D object hypotheses. For example, radar processor 836 (FIG. 8) may generate the 2D AoA information based on the 2D AoA spectrum analysis of the radar Rx data 811 (FIG. 8) according to the plurality of 2D object hypotheses, e.g., as described above.

Reference is made to FIG. 1212, which schematically illustrates a product of manufacture 1200, in accordance with some demonstrative aspects. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations and/or functionalities of radar processor 834 (FIG. 8), one or more operations and/or functionalities described with reference to the FIGS. 1-11, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1200 and/or storage media 1202 may include one or more types of computer-readable storage media capable of storing data, including volatile memory, non-volatile memory, removable or non-removable memory, erasable or non-erasable memory, writeable or re-writeable memory, and the like. For example, storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1204 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising a radar processor, the radar processor comprising an input to receive radar receive (Rx) data, the radar Rx data based on radar signals of a Two Dimensional (2D) radar antenna; and a processor to generate radar information based on the radar Rx data, the radar information comprising 2D Angle of Arrival (AoA) information in an Azimuth-Elevation domain, wherein the processor is configured to determine a first one-dimensional (1D) AoA spectrum corresponding to a first dimension of the Azimuth-Elevation domain based on the radar Rx data, to determine a second 1D AoA spectrum corresponding to a second dimension of the Azimuth-Elevation domain based on the radar Rx data, to detect one or more first object hypotheses in the first dimension based on the first 1D AoA spectrum, to detect one or more second object hypotheses in the second dimension based on the second 1D AoA spectrum, to determine a plurality of 2D object hypotheses corresponding to the Azimuth-Elevation domain based on the first object hypotheses and the second object hypotheses, and to generate the 2D AoA information based on a 2D AoA spectrum analysis of the radar Rx data according to the plurality of 2D object hypotheses.

Example 2 includes the subject matter of Example 1, and optionally, wherein the radar processor is configured to determine a candidate set of 2D object hypotheses based on the first object hypotheses and the second object hypotheses, to determine a reduced candidate set of 2D object hypotheses by excluding one or more 2D object hypotheses from the candidate set of 2D object hypotheses based on at least one exclusion criterion, and to generate the 2D AoA information based on the 2D AoA spectrum analysis of the radar Rx data according to the reduced candidate set of 2D object hypotheses.

Example 3 includes the subject matter of Example 1 or 2, and optionally, wherein the radar processor is configured to identify one or more regions of the Azimuth-Elevation domain, and to determine at least one 1D AoA spectrum of the first 1D AoA spectrum or the second 1D AoA spectrum in, e.g., in only, the one or more regions of the Azimuth-Elevation domain.

Example 4 includes the subject matter of Example 3, and optionally, wherein the radar processor is configured to identify the one or more regions based on a coarse AoA spectrum analysis of the Rx radar data, a resolution of the coarse AoA spectrum analysis is lower than a resolution of the at least one 1D AoA spectrum.

Example 5 includes the subject matter of Example 3 or 4, and optionally, wherein the radar processor is configured to identify the one or more regions based on at least one of map information, scene occlusions, a planned maneuver, a trajectory or a Transmit (TX) Beamforming (BF) configuration.

Example 6 includes the subject matter of any one of Examples 1-5, and optionally, wherein the radar processor is configured to determine a plurality of AoA spectral points based on the 2D AoA spectrum analysis, to identify one or more selected AoA spectral points from the plurality of AoA spectral points based on a detection threshold, and to generate the 2D AoA information comprising 2D AoA information corresponding to the selected AoA spectral points.

Example 7 includes the subject matter of Example 6, and optionally, wherein the radar processor is configured to dynamically set the detection threshold based on one or more detection criteria.

Example 8 includes the subject matter of any one of Examples 1-7, and optionally, wherein the radar processor is configured to determine at least one 1D AoA spectrum of the first 1D AoA spectrum or the second 1D AoA spectrum according to a super resolution spectrum analysis algorithm.

Example 9 includes the subject matter of Example 8, and optionally, wherein the radar processor is configured to determine a particular 1D AoA spectrum corresponding to a particular dimension of the first dimension or the second dimension by determining a covariance matrix corresponding to the particular dimension, and determining the particular 1D AoA spectrum according to the super resolution spectrum analysis algorithm based on the covariance matrix corresponding to the particular dimension, the radar processor is configured to determine the covariance matrix corresponding to the particular dimension by applying to the radar Rx data at least one of a Spatial smoothing technique or a Forward-Backward technique.

Example 10 includes the subject matter of Example 9, and optionally, wherein the radar processor is configured to determine the covariance matrix corresponding to the particular dimension based on combined Rx data corresponding to a plurality of 1D antenna indexes in a first antenna dimension of the 2D radar antenna, wherein combined Rx data corresponding to a 1D antenna index in the first antenna dimension is based on a combination of a plurality of data values in the radar Rx data, which correspond to the 1D antenna index in the first antenna dimension, the plurality of data values corresponding to a plurality of antenna indexes in a second antenna dimension of the 2D radar antenna.

Example 11 includes the subject matter of any one of Examples 8-10, and optionally, wherein the super resolution spectrum analysis algorithm comprises a Minimum Variance Distortionless Response (MVDR) algorithm, a Minimum Power Distortionless Response (MPDR) algorithm, or a Multiple Signal Classification (MUSIC) algorithm.

Example 12 includes the subject matter of any one of Examples 1-11, and optionally, wherein the radar processor is configured to determine at least one 1D AoA spectrum of the first 1D AoA spectrum or the second 1D AoA spectrum according to a delay-and-sum algorithm.

Example 13 includes the subject matter of any one of Examples 1-12, and optionally, wherein the radar processor is configured to determine a particular 1D AoA spectrum corresponding to a particular dimension of the first dimension or the second dimension by determining a plurality of intermediate 1D AoA spectrums corresponding to a respective plurality of subarrays in the particular dimension of the 2D radar antenna, and to determine the particular 1D AoA spectrum based on a combination of the plurality of intermediate 1D AoA spectrums.

Example 14 includes the subject matter of Example 13, and optionally, wherein the particular dimension comprises the azimuth dimension, and the plurality of subarrays comprises a plurality of rows of the 2D radar antenna.

Example 15 includes the subject matter of Example 13, and optionally, wherein the particular dimension comprises the elevation dimension, and the plurality of subarrays comprises a plurality of columns of the 2D radar antenna.

Example 16 includes the subject matter of any one of Examples 1-15, and optionally, wherein the radar processor is configured to determine the first 1D AoA spectrum according to a first spectrum analysis algorithm, and to determine the second 1D AoA spectrum according to a second spectrum analysis algorithm different from the first spectrum analysis algorithm.

Example 17 includes the subject matter of any one of Examples 1-16, and optionally, wherein the radar processor is configured to determine the first 1D AoA spectrum and the second 1D AoA spectrum according to a same spectrum analysis algorithm.

Example 18 includes the subject matter of any one of Examples 1-17, and optionally, wherein the radar processor is configured to determine the one or more first object hypotheses according to a first object detection scheme, and to determine the one or more second object hypotheses according to a second object detection scheme different from the first object detection scheme.

Example 19 includes the subject matter of any one of Examples 1-17, and optionally, wherein the radar processor is configured to determine the one or more first object hypotheses and the one or more second object hypotheses according to a same object detection scheme.

Example 20 includes the subject matter of any one of Examples 1-19, and optionally, wherein the 2D AoA spectrum analysis comprises a super resolution spectrum analysis algorithm.

Example 21 includes the subject matter of any one of Examples 1-19, and optionally, wherein the 2D AoA spectrum analysis comprises a delay-and-sum algorithm.

Example 22 includes the subject matter of any one of Examples 1-19, and optionally, wherein the 2D AoA spectrum analysis comprises a maximum-likelihood (ML) algorithm.

Example 23 includes the subject matter of any one of Examples 1-22, and optionally, wherein the radar processor is configured to determine the first 1D AoA spectrum, the second 1D AoA spectrum, and the 2D AoA information according to a coupled coordinate system.

Example 24 includes the subject matter of any one of Examples 1-22, and optionally, wherein the radar processor is configured to determine the first 1D AoA spectrum, the second 1D AoA spectrum, and the 2D AoA information according to a non-coupled coordinate system.

Example 25 includes the subject matter of any one of Examples 1-24, and optionally, wherein the radar processor is configured to determine the second 1D AoA spectrum based on the one or more first object hypotheses in the first dimension based on the first 1D AoA spectrum.

Example 26 includes the subject matter of Example 25, and optionally, wherein the first dimension of the Azimuth-Elevation domain comprises an azimuth dimension, and the second dimension of the Azimuth-Elevation domain comprises an elevation dimension.

Example 27 includes the subject matter of Example 25, and optionally, wherein the first dimension of the Azimuth-Elevation domain comprises an elevation dimension, and the second dimension of the Azimuth-Elevation domain comprises an azimuth dimension.

Example 28 includes the subject matter of any one of Examples 1-27, and optionally, wherein the radar processor is configured to determine the plurality of 2D object hypotheses based on a respective plurality of different combinations of a hypothesis from the first object hypotheses and a hypothesis from the second object hypotheses.

Example 29 includes the subject matter of any one of Examples 1-28, and optionally, wherein the radar processor is configured to generate the 2D AoA information configured for a Field of View (FOV) parameter and a resolution parameter, and wherein a count of the plurality of 2D object hypotheses is less than 10% of a count of points in the Azimuth-Elevation domain according to the FOV parameter and the resolution parameter.

Example 30 includes the subject matter of Example 29, and optionally, wherein the count of the plurality of 2D object hypotheses is less than 5% of the count of points in the Azimuth-Elevation domain according to the FOV parameter and the resolution parameter.

Example 31 includes the subject matter of Example 29, and optionally, wherein the count of the plurality of 2D object hypotheses is less than 1% of the count of points in the Azimuth-Elevation domain according to the FOV parameter and the resolution parameter.

Example 32 includes the subject matter of any one of Examples 1-31, and optionally, wherein the 2D radar antenna comprises a plurality of Rx antennas and a plurality of Transmit (Tx) antennas.

Example 33 includes the subject matter of any one of Examples 1-32, and optionally, wherein the 2D radar antenna comprises a 2D Multiple-Input-Multiple-Output (MIMO) radar antenna.

Example 34 includes the subject matter of any one of Examples 1-33, and optionally, comprising the 2D radar antenna, and a plurality of Rx chains to generate the radar Rx data based on radar signals received via a plurality of Rx antennas of the 2D radar antenna.

Example 35 includes the subject matter of Example 34, and optionally, comprising a vehicle, the vehicle comprising a system controller to control one or more systems of the vehicle based on the radar information.

Example 36 includes an apparatus comprising means for executing any of the described operations of Examples 1-35.

Example 37 includes a machine-readable medium that stores instructions for execution by a processor to perform any of the described operations of Examples 1-35.

Example 38 includes an apparatus comprising a memory; and processing circuitry configured to perform any of the described operations of Examples 1-35.

Example 39 includes a method including any of the described operations of Examples 1-35.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a radar processor, the radar processor comprising:
    an input to receive Two Dimensional (2D) radar receive (Rx) data, the 2D radar Rx data based on radar signals of a 2D radar antenna; and
    a processor configured to:
        determine a first one-dimensional (1D) Angle of Arrival (AoA) spectrum corresponding to a first dimension of an Azimuth-Elevation domain based on a first spectrum analysis of the 2D radar Rx data;
        determine a second 1D AoA spectrum corresponding to a second dimension of the Azimuth-Elevation domain based on a second spectrum analysis of the 2D radar Rx data;
        detect one or more first object hypotheses in the first dimension based on the first 1D AoA spectrum;
        detect one or more second object hypotheses in the second dimension based on the second 1D AoA spectrum;
        determine a plurality of 2D object hypotheses corresponding to the Azimuth-Elevation domain based on the first object hypotheses and the second object hypotheses; and
        generate 2D AoA information in the Azimuth-Elevation domain based on a 2D AoA spectrum analysis of the 2D radar Rx data according to the plurality of 2D object hypotheses.

2. The apparatus of claim 1, wherein the radar processor is configured to:
    determine a candidate set of 2D object hypotheses based on the first object hypotheses and the second object hypotheses;
    determine a reduced candidate set of 2D object hypotheses by excluding one or more 2D object hypotheses from the candidate set of 2D object hypotheses based on at least one exclusion criterion; and
    generate the 2D AoA information based on the 2D AoA spectrum analysis of the 2D radar Rx data according to the reduced candidate set of 2D object hypotheses.

3. The apparatus of claim 1, wherein the radar processor is configured to identify one or more regions of the Azimuth-Elevation domain, and to determine at least one 1D AoA spectrum of the first 1D AoA spectrum or the second 1D AoA spectrum in the one or more regions of the Azimuth-Elevation domain.

4. The apparatus of claim 3, wherein the radar processor is configured to identify the one or more regions based on a coarse AoA spectrum analysis of the 2D radar Rx data, wherein a resolution of the coarse AoA spectrum analysis is lower than a resolution of the at least one 1D AoA spectrum.

5. The apparatus of claim 3, wherein the radar processor is configured to identify the one or more regions based on at least one of map information, scene occlusions, a planned maneuver, a trajectory or a Transmit (TX) Beamforming (BF) configuration.

6. The apparatus of claim 1, wherein the radar processor is configured to determine a plurality of AoA spectral points based on the 2D AoA spectrum analysis, to identify one or more selected AoA spectral points from the plurality of AoA spectral points based on a detection threshold, and to generate the 2D AoA information comprising 2D AoA information corresponding to the selected AoA spectral points.

7. The apparatus of claim 6, wherein the radar processor is configured to dynamically set the detection threshold based on one or more detection criteria.

8. The apparatus of claim 1, wherein the radar processor is configured to determine at least one 1D AoA spectrum of the first 1D AoA spectrum or the second 1D AoA spectrum according to a super resolution spectrum analysis algorithm.

9. The apparatus of claim 8, wherein the radar processor is configured to determine a particular 1D AoA spectrum corresponding to a particular dimension of the first dimension or the second dimension by determining a covariance matrix corresponding to the particular dimension, and by determining the particular 1D AoA spectrum according to the super resolution spectrum analysis algorithm based on the covariance matrix corresponding to the particular dimension, wherein the radar processor is configured to determine the covariance matrix corresponding to the particular dimension by applying to the 2D radar Rx data at least one of a Spatial smoothing technique or a Forward-Backward technique.

10. The apparatus of claim 9, wherein the radar processor is configured to determine the covariance matrix corresponding to the particular dimension based on combined Rx data corresponding to a plurality of 1D antenna indexes in a first antenna dimension of the 2D radar antenna, wherein combined Rx data corresponding to a 1D antenna index in the first antenna dimension is based on a combination of a plurality of data values in the 2D radar Rx data, which correspond to the 1D antenna index in the first antenna dimension, the plurality of data values corresponding to a plurality of antenna indexes in a second antenna dimension of the 2D radar antenna.

11. The apparatus of claim 8, wherein the super resolution spectrum analysis algorithm comprises a Minimum Variance Distortionless Response (MVDR) algorithm, a Minimum Power Distortionless Response (MPDR) algorithm, or a Multiple Signal Classification (MUSIC) algorithm.

12. The apparatus of claim 1, wherein the radar processor is configured to determine a particular 1D AoA spectrum corresponding to a particular dimension of the first dimension or the second dimension by determining a plurality of intermediate 1D AoA spectrums corresponding to a respective plurality of subarrays of the 2D radar antenna in the particular dimension, and to determine the particular 1D AoA spectrum based on a combination of the plurality of intermediate 1D AoA spectrums.

13. The apparatus of claim 12, wherein the particular dimension comprises an azimuth dimension, and the plurality of subarrays comprises a plurality of rows of the 2D radar antenna.

14. The apparatus of claim 12, wherein the particular dimension comprises an elevation dimension, and the plurality of subarrays comprises a plurality of columns of the 2D radar antenna.

15. The apparatus of claim 1, wherein the radar processor is configured to determine the first 1D AoA spectrum according to a first spectrum analysis algorithm, and to determine the second 1D AoA spectrum according to a second spectrum analysis algorithm different from the first spectrum analysis algorithm.

16. The apparatus of claim 1, wherein the radar processor is configured to determine the one or more first object hypotheses according to a first object detection technique, and to determine the one or more second object hypotheses according to a second object detection technique different from the first object detection technique.

17. The apparatus of claim 1, wherein the radar processor is configured to determine the second 1D AoA spectrum based on the one or more first object hypotheses in the first dimension based on the first 1D AoA spectrum.

18. The apparatus of claim 1, wherein the radar processor is configured to generate the 2D AoA information configured for a Field of View (FOV) parameter and a resolution parameter, and wherein a count of the plurality of 2D object hypotheses is less than 10% of a count of Azimuth-Elevation points in the Azimuth-Elevation domain according to the FOV parameter and the resolution parameter.

19. The apparatus of claim 1 comprising the 2D radar antenna, and a plurality of Rx chains to generate the 2D radar Rx data based on radar signals received via a plurality of Rx antennas of the 2D radar antenna.

20. A product comprising one or more tangible computer-readable non-transitory storage media comprising computer-executable instructions operable to, when executed by at least one processor, enable the at least one processor to cause a radar device to:

determine a first one-dimensional (1D) Angle of Arrival (AoA) spectrum corresponding to a first dimension of an Azimuth-Elevation domain based on a first spectrum analysis of Two Dimensional (2D) radar receive (Rx) data, the 2D radar Rx data based on radar signals of a 2D radar antenna;

determine a second 1D AoA spectrum corresponding to a second dimension of the Azimuth-Elevation domain based on a second spectrum analysis of the 2D radar Rx data;

detect one or more first object hypotheses in the first dimension based on the first 1D AoA spectrum;

detect one or more second object hypotheses in the second dimension based on the second 1D AoA spectrum;

determine a plurality of 2D object hypotheses corresponding to the Azimuth-Elevation domain based on the first object hypotheses and the second object hypotheses; and generate 2D AoA information in the Azimuth-Elevation domain based on a 2D AoA spectrum analysis of the 2D radar Rx data according to the plurality of 2D object hypotheses.

21. The product of claim 20, wherein the instructions, when executed, cause the radar device to determine a candidate set of 2D object hypotheses based on the first object hypotheses and the second object hypotheses, to determine a reduced candidate set of 2D object hypotheses by excluding one or more 2D object hypotheses from the candidate set of 2D object hypotheses based on at least one exclusion criterion, and to generate the 2D AoA information based on the 2D AoA spectrum analysis of the 2D radar Rx data according to the reduced candidate set of 2D object hypotheses.

22. The product of claim 20, wherein the instructions, when executed, cause the radar device to identify one or more regions of the Azimuth-Elevation domain, and to determine at least one 1D AoA spectrum of the first 1D AoA spectrum or the second 1D AoA spectrum in the one or more regions of the Azimuth-Elevation domain.

23. The product of claim 20, wherein the instructions, when executed, cause the radar device to determine a plurality of AoA spectral points based on the 2D AoA spectrum analysis, to identify one or more selected AoA spectral points from the plurality of AoA spectral points based on a detection threshold, and to generate the 2D AoA information comprising 2D AoA information corresponding to the selected AoA spectral points.

24. A vehicle comprising:

a system controller configured to control one or more vehicular systems of the vehicle based on radar information; and a radar device configured to provide the radar information to the system controller, the radar device comprising:

a Two Dimensional (2D) radar antenna comprising a plurality of Transmit (Tx) antennas to transmit Tx radar signals, and a plurality of Receive (Rx) antennas to receive Rx radar signals based on the Tx radar signals; and a processor configured to generate the radar information based on 2D radar Rx data, the 2D radar Rx data based on the Rx radar signals, the radar information comprising 2D Angle of Arrival (AoA) information in an Azimuth-Elevation domain, wherein the processor is configured to determine a first one-dimensional (1D) AoA spectrum corresponding to a first dimension of the Azimuth-Elevation domain based on a first spectrum analysis of the 2D radar Rx data, to determine a second 1D AoA spectrum corresponding to a second dimension of the Azimuth-Elevation domain based on a second spectrum analysis of the 2D radar Rx data, to detect one or more first object hypotheses in the first dimension based on the first 1D AoA spectrum, to detect one or more second object hypotheses in the second dimension based on the second 1D AoA spectrum, to determine a plurality of 2D object hypotheses corresponding to the Azimuth-Elevation domain based on the first object hypotheses and the second object hypotheses, and to generate the 2D AoA information based on a 2D AoA spectrum analysis of the 2D radar Rx data according to the plurality of 2D object hypotheses.

25. The vehicle of claim 24, wherein the processor is configured to determine a candidate set of 2D object hypotheses based on the first object hypotheses and the second object hypotheses, to determine a reduced candidate set of 2D object hypotheses by excluding one or more 2D object hypotheses from the candidate set of 2D object hypotheses based on at least one exclusion criterion, and to generate the 2D AoA information based on the 2D AoA spectrum analysis of the 2D radar Rx data according to the reduced candidate set of 2D object hypotheses.

* * * * *